US009665695B2

(12) United States Patent
Jenson

(10) Patent No.: US 9,665,695 B2
(45) Date of Patent: May 30, 2017

(54) SYSTEMS AND METHODS FOR RANKING RULES THAT IDENTIFY POTENTIALLY ILLEGITIMATE ACTIVITIES

(71) Applicant: Facebook, Inc., Menlo Park, CA (US)

(72) Inventor: Daniel Adam Jenson, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 360 days.

(21) Appl. No.: 14/314,924

(22) Filed: Jun. 25, 2014

(65) Prior Publication Data

US 2015/0379405 A1    Dec. 31, 2015

(51) Int. Cl.
*G06F 21/00* (2013.01)
*G06Q 50/00* (2012.01)
*G06N 5/02* (2006.01)
*G06Q 10/10* (2012.01)
*G06N 99/00* (2010.01)

(52) U.S. Cl.
CPC ............ *G06F 21/00* (2013.01); *G06N 5/025* (2013.01); *G06Q 10/10* (2013.01); *G06Q 50/01* (2013.01); *G06N 99/005* (2013.01)

(58) Field of Classification Search
None
See application file for complete search history.

(56) References Cited

U.S. PATENT DOCUMENTS

2008/0109392 A1*  5/2008  Nandy ................... G06N 5/025
                                                    706/47
2011/0295722 A1* 12/2011  Reisman ............ G06Q 30/0201
                                                   705/27.1

* cited by examiner

*Primary Examiner* — Alan Chen
(74) *Attorney, Agent, or Firm* — Sheppard Mullin Richter & Hampton LLP

(57) ABSTRACT

Systems, methods, and non-transitory computer-readable media can acquire information associated with a set of rules and a set of activities identified by the set of rules as being potentially illegitimate. A priority order for a set of properties associated with the set of rules can be acquired. The set of rules can be ranked based on the priority order. A highest ranked rule can be stored into a record. The highest ranked rule can be removed from consideration out of the set of rules. At least one activity, identified by the highest ranked rule, can be removed from consideration out of the set of activities. In some instances, the record can be provided.

19 Claims, 16 Drawing Sheets

|  | Precision | Amount TP | Name |
|---|---|---|---|
| Rule A | 90.0% | 9 | A |
| Rule C | 75.0% | 6 | C |
| Rule B | 75.0% | 6 | B |

550

| | Amount TP | Precision | Name |
|---|---|---|---|
| Rule B | 10 | 71.4% | B |
| Rule A | 6 | 100.0% | A |
| Rule C | 5 | 83.3% | C |

SYSTEMS AND METHODS FOR RANKING RULES THAT IDENTIFY POTENTIALLY ILLEGITIMATE ACTIVITIES

FIELD OF THE INVENTION

The present technology relates to the field of identifying illegitimate activities. More particularly, the present technology provides techniques for ranking rules that identify potentially illegitimate activities.

BACKGROUND

Today, people often interact with networked environments. Many users of computing devices frequently browse web sites, access online media content, or otherwise use network services. Users with access to the Internet can perform online shopping, watch streaming movies, download software, and utilize social networking services. In one example, a user of a social networking service can purchase applications (e.g., games), give gifts (e.g., gift cards), publish advertisements, distribute promotions, or conduct various other transactions. To fund various transactions, the user can provide his or her payment information (e.g., credit card information, bank account information) to the social network service. However, occasionally, another user can attempt to illegitimately (e.g., fraudulently) gain access to the user's payment information or otherwise compromise the user's legitimate account within the social networking service.

In another example, a user of an online resource, such as a shopping website or an online media service, can participate in various activities that involve the use of financial instruments compatible or operable with the online resource. However, in some cases, the financial instruments of the user can be stolen, illegitimately used, or otherwise compromised. These and other similar concerns can reduce the overall user experience associated with using financial instruments in networked environments.

SUMMARY

Various embodiments of the present disclosure can include systems, methods, and non-transitory computer readable media configured to acquire information associated with a set of rules and a set of activities identified by the set of rules as being potentially illegitimate. A priority order for a set of properties associated with the set of rules can be acquired. The set of rules can be ranked based on the priority order. A highest ranked rule can be stored into a record. The highest ranked rule can be removed from consideration out of the set of rules. At least one activity, identified by the highest ranked rule, can be removed from consideration out of the set of activities. In some instances, the record can be provided.

In one embodiment, the removing of the highest ranked rule out of the set of rules can produce a subset of rules. The removing of the at least one activity out of the set of activities can produce a subset of activities.

In one embodiment, the subset of rules can be ranked based on the priority order. A next highest ranked rule can be stored into the record as a next entry. The next highest ranked rule can be removed from consideration out of the subset of rules. At least one activity, identified by the next highest ranked rule, can be removed from consideration out of the subset of activities.

In one embodiment, the ranking of the subset of rules, the storing of the next highest ranked rule into the record, the removing of the next highest ranked rule out of the subset of rules, and the removing of the at least one activity out of the subset of activities can be performed repeatedly until no rules are left in the subset of rules.

In one embodiment, the ranking of the subset of rules, the storing of the next highest ranked rule into the record, the removing of the next highest ranked rule out of the subset of rules, and the removing of the at least one activity out of the subset of activities can be performed prior to the providing of the record.

In one embodiment, the providing of the record can correspond to at least one of presenting at least a portion of data included in the record, generating a report based on the at least the portion of data included in the record, or transmitting a communication based on the at least the portion of the data included in the record.

In one embodiment, the acquiring of the priority order can be based on at least one of a user instruction, a system instruction, or a defined setting.

In one embodiment, the set of properties can include at least a first property and a second property. The priority order can prioritize the first property over the second property.

In one embodiment, the ranking of the set of rules can further comprise ranking the set of rules based on the first property and ranking at least some rules in the set of rules based on the second property when the at least some rules are tied with respect to the first property.

In one embodiment, the set of properties can include at least one of a respective precision by amount value associated with each rule in the set of rules, a respective true positive amount value associated with each rule in the set of rules, a respective precision by event value associated with each rule in the set of rules, a respective true positive event value associated with each rule in the set of rules, or a respective identifier associated with each rule in the set of rules.

In one embodiment, threshold criteria for retaining rules can be defined. In some cases, it can be determined that at least one rule in the record satisfies the threshold criteria for retaining rules. The at least one rule can be implemented to identify potentially illegitimate activities.

In one embodiment, the threshold criteria for retaining rules can be satisfied when the at least one rule is associated with a benefit that outweighs a cost associated with the at least one rule.

In one embodiment, one or more rules in the record that fail to satisfy the threshold criteria for retaining rules can be deprecated.

In one embodiment, the record can include at least one of a list, a sequence, an order, or a group.

In one embodiment, the set of activities can be identified by the set of rules as being potentially illegitimate based on historical data.

In one embodiment, one or more activities in the set of activities can correspond to one or more fraudulent transactions occurring in a networked environment.

In one embodiment, the set of activities can be identified by the set of rules as being potentially illegitimate based on applying one or more machine learning techniques to the historical data.

In one embodiment, the one or more machine learning techniques can be associated with at least one of an information gain technique, a classification technique, a clustering technique, a decision tree classifier technique, a decision tree learning technique, a random forest technique, a logistic regression technique, a linear regression technique, or a gradient boosting technique.

Many other features and embodiments of the invention will be apparent from the accompanying drawings and from the following detailed description.

BRIEF DESCRIPTION OF THE DRAWINGS

FIG. 6D illustrates an example record for storing ranked rules that identify potentially illegitimate activities, according to an embodiment of the present disclosure.

Figure 1:
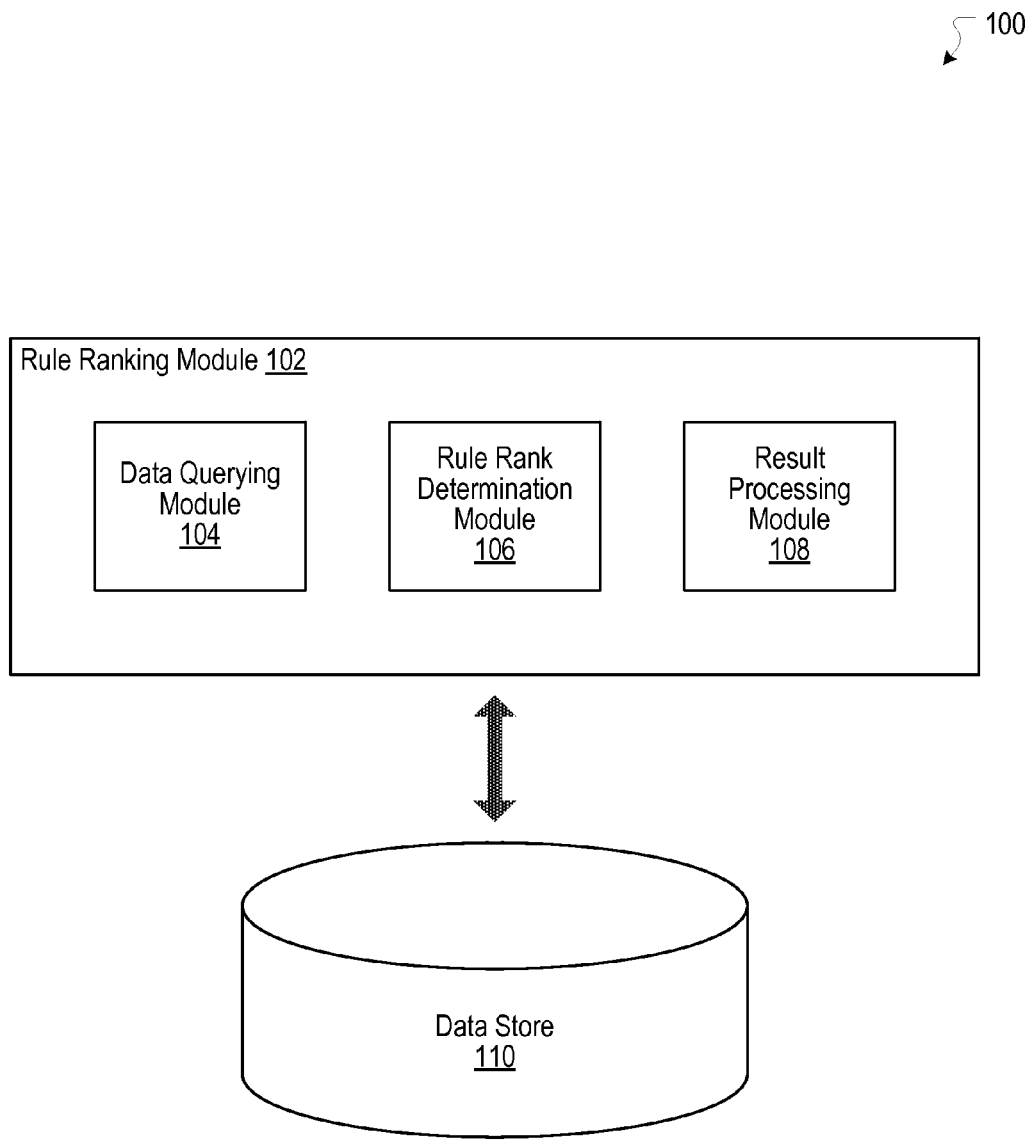
FIG. 1 illustrates an example system including an example rule ranking module configured to facilitate ranking rules that identify potentially illegitimate activities, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Ranking Rules that Identify Potentially Illegitimate Activities

People often conduct transactions or engage in activities that involve the use of financial instruments, such as credit cards, bank accounts, electronic or digital payment services, etc. When users of computing devices utilize use financial instruments in a networked environment (e.g., Internet, cellular data network, online service, etc.), the users must often provide information about their financial instruments. In some cases, illegitimate users can attempt to steal information about financial instruments of legitimate online service users. In some cases, an illegitimate user can attempt to link a stolen financial instrument with a legitimate user's online service account.

Conventional approaches to detecting, reducing, or preventing illegitimate activities (and/or illegitimate users) include manually reviewing the activities, such as by scrutinizing properties, characteristics, or traits associated with the activities, to determine patterns or trends that are frequently found to be linked to illegitimate users or activities. Upon determining the patterns or trends, rules (also referred to as policies) for identifying illegitimate activities can be manually created. However, conventional approaches are generally time-consuming and require significant manual resources.

Moreover, it can often be difficult or challenging to accurately measure or gauge how well the rules are performing. For example, in some cases, a rule (or policy) that identifies potentially illegitimate activities can incorrectly identify activities that are actually legitimate. In other words, rules that identify illegitimate activities can sometimes capture false positives. This should be reduced or minimized. In another example, the quantity of rules that are implemented can be overly numerous, thereby unnecessarily increasing the complexity of an illegitimate activity identification system. Accordingly, it can be advantageous to reliably measure or gauge the performance of such rules and rank the rules to determine which rules are most precise, comprehensive, suitable, appropriate, and/or optimal for identifying illegitimate activities.

Various embodiments of the present disclosure can measure or gauge the performance of rules that identify potentially illegitimate activities and rank the rules based on how well they perform. For example, various embodiments can calculate, determine, and/or acquire performance metrics or other properties associated with the rules and rank the rules based on the performance metrics or other properties. The results can be analyzed or otherwise processed. In some cases, sufficiently highly ranked rules can be retained and implemented, while other rules can be deprecated or terminated. In some instances, the ranking of the rules can be performed repeated (e.g., recursively, iteratively, etc.). In some cases, the ranking of the rules can be based on the inclusion-exclusion principle.

FIG. 1 illustrates an example system 100 including an example rule ranking module 102 configured to facilitate ranking rules that identify potentially illegitimate activities, according to an embodiment of the present disclosure. The rule ranking module 102 can include a data querying module 104, a rule rank determination module 106, and a result processing module 108. As shown in the example of FIG. 1, the example system 100 can also include a data store 110.

The rule ranking module 102 can be configured to exchange information, share data, and/or otherwise communicate with the data store 110. In some embodiments, the data store 110 can store information associated with and/or representative of rules that identify potentially illegitimate activities as well as activities identified by the rules. As discussed previously, an activity can correspond to a transaction or incident that relates to and/or involves the use of financial instruments. In some cases, financial instruments can be used in a networked environment, such as for online purchases, online microtransactions, etc. The rules can identify fraudulent activities, such as when a fraudulent users illegally gains access to and uses a legitimate user's financial instrument.

The data querying module 104 can be configured to query the data store 110 for requested data. The requested data can include information about and/or information representing a set of rules for identifying potentially illegitimate activities as well as a set of activities identified by the set of rules as being potentially illegitimate. As such, the rule ranking module 102 can acquire information associated with the set of rules and the set of activities via the data querying module 104. In some embodiments, the requested data can fall within a time period, a date range, and/or other parameters specified by the data querying module 104.

The rule rank determination module 106 can be configured to facilitate determining a ranking of the rules based on the acquired information relating to the set of rules and the set of activities. For example, the rule ranking determination module 106 can provide a listing of the set of rules ordered or sorted based on certain ranking preferences or ranking criteria.

The result processing module 108 can be configured to process or otherwise handle the results from the rule ranking determination module 106. In one example, the result processing module 108 can provide a report and/or a communication including the ranked (e.g., ordered, sorted) set of rules. In some embodiments, the rule rank determination module 106 and the result processing module 108 can be implemented within a single module. In some embodiments, the rule rank determination module 106 and the result processing module 108 can reside together, work in conjunction, and/or operate as a unit.

In some cases, the rules can identify activities as being potentially illegitimate based on historical data. In some instances, the rules can apply one or more machine learning techniques to the historical data to identify activities as being potentially illegitimate. The one or more machine learning techniques can, for example, be associated with at least one of an information gain technique, a classification technique, a clustering technique, a decision tree classifier technique, a decision tree learning technique, a random forest technique, a logistic regression technique, a linear regression technique, or a gradient boosting technique.

Figure 2:
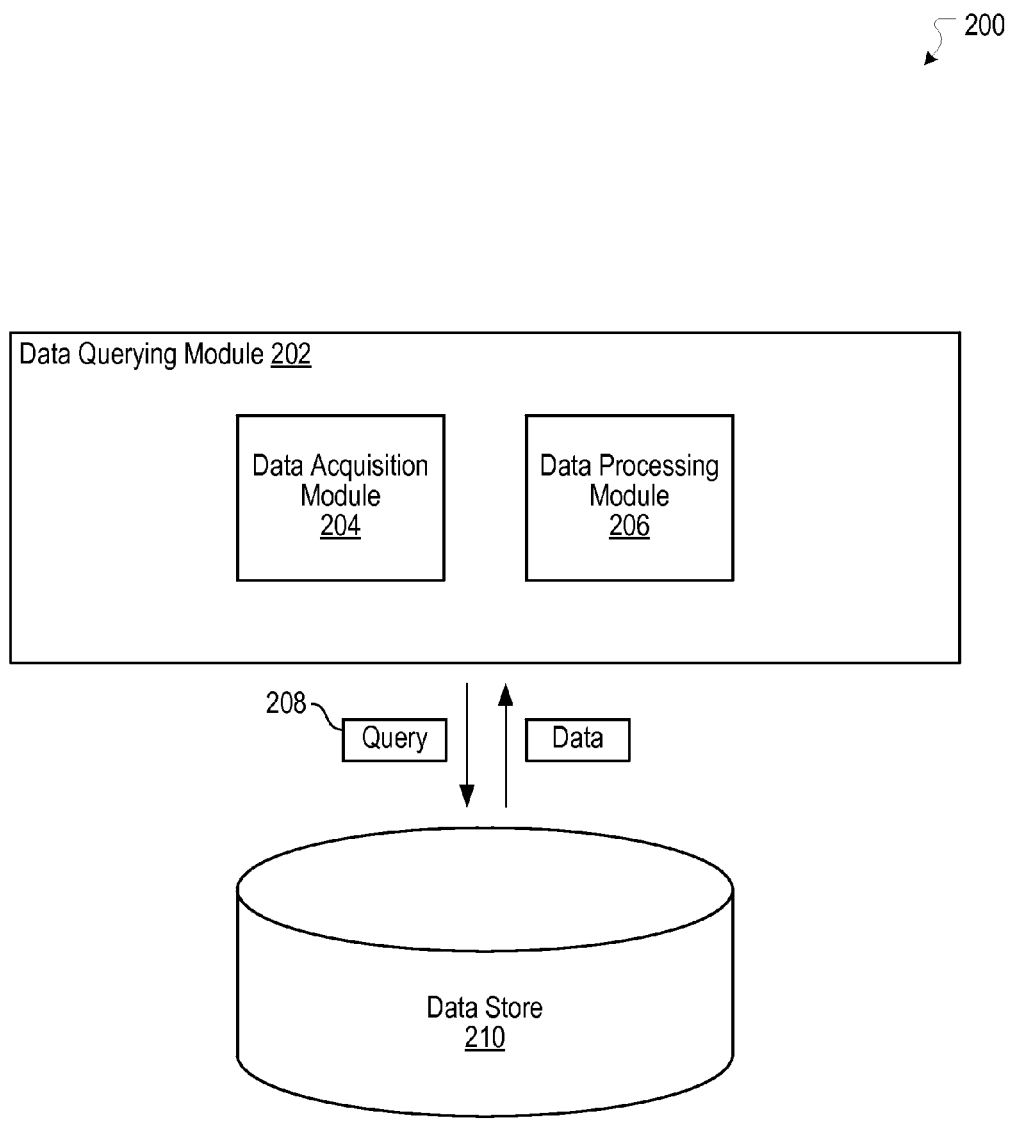
FIG. 2 illustrates an example system including an example data querying module, according to an embodiment of the present disclosure.

FIG. 2 illustrates an example system 200 including an example data querying module 202, according to an embodiment of the present disclosure. The example data querying module 202 in system 200 can correspond to the data querying module 104 of FIG. 1. The example system 200 can also include a data store 210, which can correspond to the data store 110 of FIG. 1.

The data querying module 202 can include a data acquisition module 204 and a data processing module 206. The data querying module 202 can utilize the data acquisition module 204 to acquire information associated with a set of rules and a set of activities identified by the set of rules as being potentially illegitimate. For example, the data acquisition module 204 can transmit a query 208 to the data store 210 to request data. Based on the query 208, the data acquisition module 204 can acquire (e.g., retrieve, obtain, receive, etc.) data 212 from the data store 210. The acquired data 212 can include information associated with the set of rules and information associated with the set of activities.

In some embodiments, the acquired data 212 can be utilized to identify various rules within a system for identifying illegitimate activities. For example, the acquired data 212 can identify or point out all of the rules that are currently active or implemented in the system for identifying illegitimate activities. The acquired data 212 can also indicate all of the activities identified by each respective rule.

Moreover, the information associated with the set of rules and the set of activities can include a set of properties associated with the set of rules. In some embodiments, the set of properties can correspond to one or more performance metrics associated with the set of rules. In some instances, there can be a property, e.g., referred to as "Precision by Amount," "Amount Precision," etc. The "Precision by Amount" property can indicate how precise a rule is. Each rule in the set of rules can have a respective value for the "Precision by Amount" property that indicates how many true positives, or verified illegitimate activities, the particular rule has identified as allegedly being illegitimate, relative to the total number of activities identified by the rule. For example, if a first rule has identified one false positive (i.e., an incorrectly identified activity that has been verified to be actually legitimate) and nine true positives, then the first rule can have a "Precision by Amount" value of 9/10 or 90%. If a second rule has identified two false positives and six true positives, then the second rule can have a "Precision by Amount" value of 6/8 or 75%.

Furthermore, in some cases, there can be another property, e.g., referred to as "Amount True Positive," "Amount TP," "True Positive Amount," "True Positive Quantity," etc. The "Amount True Positive" property can indicate the number of true positives identified by each rule in the set of rules. In the previous example, the first rule can have an "Amount True Positive" value of nine and the second rule can have an "Amount True Positive" value of six.

In some implementations, the "Amount" can refer to a monetary amount. For example, "Precision by Amount" can correspond to the amount of money associated with identified true positive activities divided by the amount of money associated with all identified activities. "True Positive Amount" can, for example, correspond to the total amount of money associated with all identified activities.

In some instances, for each rule, there can be an "Event Precision" property, which indicates the number of true positive events (e.g., verified legitimate events) identified by a respective rule relative to the total number of events identified by the respective rule. In some cases, events can include users. Moreover, there can also be an "Event True Positive" property, which indicates the total number of true positive events identified by each rule. Additionally, there can be an identification (e.g., "Name") property that provides an identifier for each rule in the set of rules. It is understood that there can be various other properties included in the information associated with the set of rules and the set of activities or in the acquired data 212.

Moreover, the data processing module 206 can access, read, analyze, format, organize, store, and/or otherwise process the acquired data 212. For example, the data processing module 206 can parse the acquired data 212 and format the data 212, if necessary, to prepare the data 212 for further analysis and/or processing.

As discussed above, the rules can be configured to identify illegitimate activities. In some cases, there can be overlap between multiple rules. For example, a first rule can correctly identify a first activity and a second activity as being illegitimate. A second rule can correctly identify the first activity, the second activity, and a third activity as being illegitimate. As such, in this example, even though the first rule correctly identifies the first and second activities, the first rule is nonetheless redundant and unnecessary since the second rule already identifies or "captures" the first and second activities as well as the third activity. The first rule is adding additional, but unnecessary, complexity into the system for identifying illegitimate activities. In this example, it can be more efficient and/or cost effective to just retain the second rule and deprecate or terminate the first rule. Moreover, it can be beneficial to deprecate certain rules that identify too many false positives, since minimizing false positives increases revenue. Various embodiments of the present disclosure can rank the rules and determine which rules are to be retained and implemented and which rules are candidates for deprecation or termination.

Figure 3:
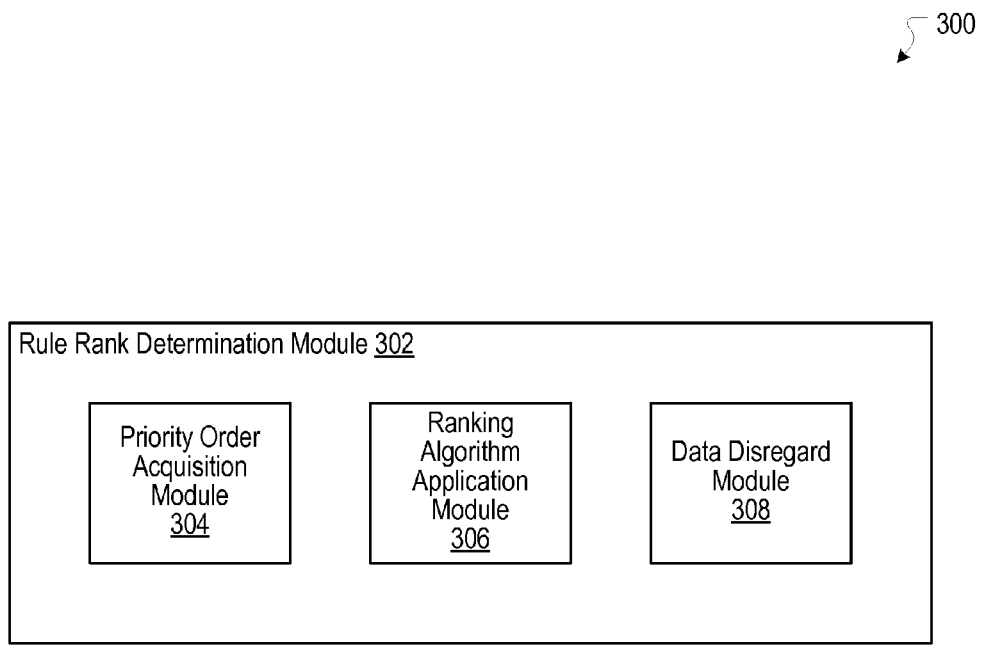
FIG. 3 illustrates an example system including an example rule rank determination module, according to an embodiment of the present disclosure.

FIG. 3 illustrates an example system 300 including an example rule rank determination module 302, according to an embodiment of the present disclosure. The example rank determination module 302 in system 300 can correspond to the rank determination module 106 of FIG. 1. The example rank determination module 302 in system 300 can include a priority order acquisition module 304, a ranking algorithm application module 306, and a data disregard module 308.

The priority order acquisition module 304 can be configured to acquire (e.g., retrieve, obtain, receive, etc.) a priority order for a set of properties associated with a set of rules. In some embodiments, a user (e.g., operator) of the system for identifying illegitimate activities can provide the priority order for the set of properties. In some embodiments, one or more defined settings of the system can provide the priority order for the set of properties. The priority order can help determine how the set of rules is to be ranked. As discussed previously, the set of properties can, for example, indicate how precise a rule is with respect to identifying activities, how many activities (or how much money) the rule has identified, how precise the rule is with respect to identifying events, how many events the rule has identified, and/or how the rule can be identified.

The priority order can specify which property is to be prioritized over another property. In one example, if it is desired to place the most emphasis on how precise the rules are with respect to identifying activities, then the "Precision by Amount" property can be prioritized over the other properties. The next point of emphasis can, for example, involve how many activities each rule has correctly identified as being illegitimate (or how much monetary costs are due to illegitimate activities), and thus "True Positive Amount" can be selected as the next property in the priority order. In this example, "Precision by Event" can be next, followed by "Event TP," and finally "Name."

The ranking algorithm application module 306 can facilitate ranking of the set of rules. In some embodiments, the ranking algorithm application module 306 can apply at least one ranking algorithm (e.g., technique, process, etc.) to the set of rules in order to rank the rules. In some implementations, the ranking algorithm can compare the rules against each another with respect to their properties and the ranking can be based on the priority order for the properties. Continuing with the priority order provided in the previous example, when two rules are compared, whichever rule has the higher "Precision by Amount" value can be ranked higher than the other rule. If the two rules have the same value for "Precision by Amount," then the two rules can be compared to each other using their "True Positive Amount" values. If their "True Positive Amount" values are also the same, then the two rules can be compared to each other based on their "Precision by Event" values, and so forth. The highest ranked rule can then be stored, placed, and/or recorded in a record (or storage structure, storage element, etc.), such as a list, a sequence, a grouping, etc.

The data disregard module 308 can be configured to remove from consideration, discount, or disregard the highest ranked rule as well as all activities identified by the highest ranked rule. For example, the data disregard module 308 can remove the highest ranked rule out of the set of rules to produce a subset of rules, and can also remove the activities identified by the highest ranked rule out of the set of activities to produce a subset of activities. The subset of activities can therefore correspond to activities that are identified by the subset of rules as being potentially illegitimate.

Subsequent to producing the subset of rules and the subset of activities, the properties associated with the subset of rules may (or may not) change. For example, if a first rule and a second rule both correctly identified a particular activity as being illegitimate (i.e., the identified activity is a true positive), and if the first rule and the identified activity are removed from consideration, then the "True Positive Amount" value for the second rule will decrease and the "Precision by Amount" value will likely decrease as well. In another example, if the first rule and the second rule both incorrectly identified a particular activity as being illegitimate (i.e., the identified activity is a false positive), and if the first rule and the identified activity are removed from consideration, then the "True Positive Amount" value for the second rule will remain the same and the "Precision by Amount" value will likely increase.

The ranking algorithm application module 306 can apply the at least one ranking algorithm to the subset of rules in order to rank the subset of rules. The ranking algorithm can still utilize the priority order for the set of properties. The set of properties associated with the subset of rules may or may not have changed, as discussed above. The subset of rules can be ranked based on their properties. The ranking of the subset of rules can produce a new highest ranked rule. The new highest ranked rule can be stored, placed, or recorded in the storage structure or record (e.g., list, sequence, group, etc.) as the next entry, after the highest ranked rule in a previous iteration. The new highest ranked rule and the activities identified by the new highest ranked rule can be removed from consideration (i.e., discounted, disregarded, etc.) by the data disregard module 308.

The process of ranking rules, and removing from consideration the highest ranked rule as well as identified activities, can repeat iteratively or recursively. In some implementations, the recursion can occur until all rules and activities have been removed from consideration, and all rules are stored or recorded in the record (or storage structure or element). In some embodiments, the recursion can occur until specified conditions are satisfied.

Figure 4:
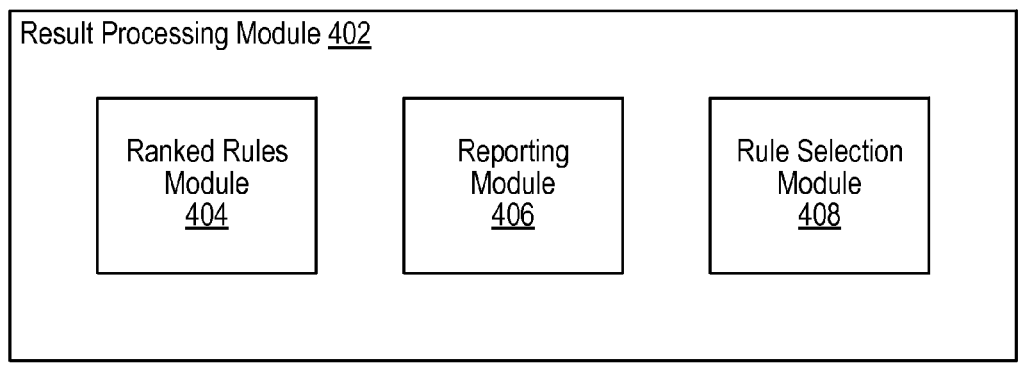
FIG. 4 illustrates an example system including an example result processing module, according to an embodiment of the present disclosure.

FIG. 4 illustrates an example system 400 including an example result processing module 402, according to an embodiment of the present disclosure. The result processing module 402 can be configured to process or otherwise handle results produced from the ranking of the rules. As shown in the example of FIG. 4, the example result processing module 402 can include a ranked rules module 404, a reporting module 406, and a rule selection module 408. In some embodiments, one or more components of the results processing module 402 (e.g., the ranked rules module 404, the reporting module 406, the rule selection module 408, etc.) can operate based on user instructions and/or system instructions. In some embodiments, the functions of the one or more components of the results processing module 402 (e.g., the ranked rules module 404, the reporting module 406, the rule selection module 408, etc.) can be performed manually.

The ranked rules module 404 can be configured to provide the record or storage structure, such as to a user or operator of the system for identifying illegitimate activities. The record or storage structure can include the completed list, sequence, order, or group of ranked rules. As discussed above, at each iteration of the rule ranking process, the highest ranked rule is placed into the storage structure as the next entry. For example, the highest ranked ruled can be stored into the record as the next entry. Accordingly, the first entry in the record (or storage structure) can include the highest ranked rule as determined during the first iteration. The second entry in the record can include the highest ranked rule as determined during the next iteration, and so forth. Accordingly, the most effective rule (where effectiveness is relative to the priority order for the set of properties) corresponds to the first entry of the record, and the least effective rule corresponds to the last entry.

The reporting module 406 can be configured to provide a report and/or communication (e.g., email, text message, etc.) including at least a portion of the results from the ranking process. For example, the reporting module 406 can produce a report and/or communication including the ranked list of rules. In some embodiments, each entry in the record can also include the properties (e.g., "Precision by Amount," "True Positive Amount," "Precision by Event," "Event TP", "Name," etc.) and/or other data associated with each respective rule. In some instances, the report and/or communication provided by the reporting module 406 can include such properties and/or other data.

The rule selection module 408 can be configured to select one or more rules to be retained and implemented in the system for identifying illegitimate activities. In some embodiments, the rule selection module 408 can define threshold criteria for retaining rules. The rule selection module 408 can determine that at least one rule in the record satisfies the threshold criteria for retaining rules. In some instances, the threshold criteria can be defined such that only a specified number of rules are retained. In some instances, the threshold criteria can be defined such that only those rules that have certain properties (e.g., at least a 70% Precision by Amount value, at least a 100 True Positive Amount value, etc.) can satisfy the threshold criteria. In some cases, the threshold criteria for retaining rules can be defined such that they are satisfied when a rule is associated with a benefit that outweighs a cost associated with the at least one rule. For example, if a particular rule incorrectly identifies one or more activities that cost $99.99, but correctly identifies one or more actually illegitimate activities that would have cost $100, then the rule can satisfy the threshold criteria. It is contemplated that many other variations are also possible.

Subsequent to determining that the at least one rule in the record satisfies the threshold criteria, the rule selection module 408 can implement (or retain if already implemented) the at least one rule for identifying illegitimate activities. In some cases, rules that are not selected to be retained can be deprecated or terminated. For example, the rule selection module 408 can deprecate one or more rules in the record that fail to satisfy the threshold criteria for retaining rules. The deprecation or termination of such rules can help to reduce the complexity of the system.

Figure 5A:
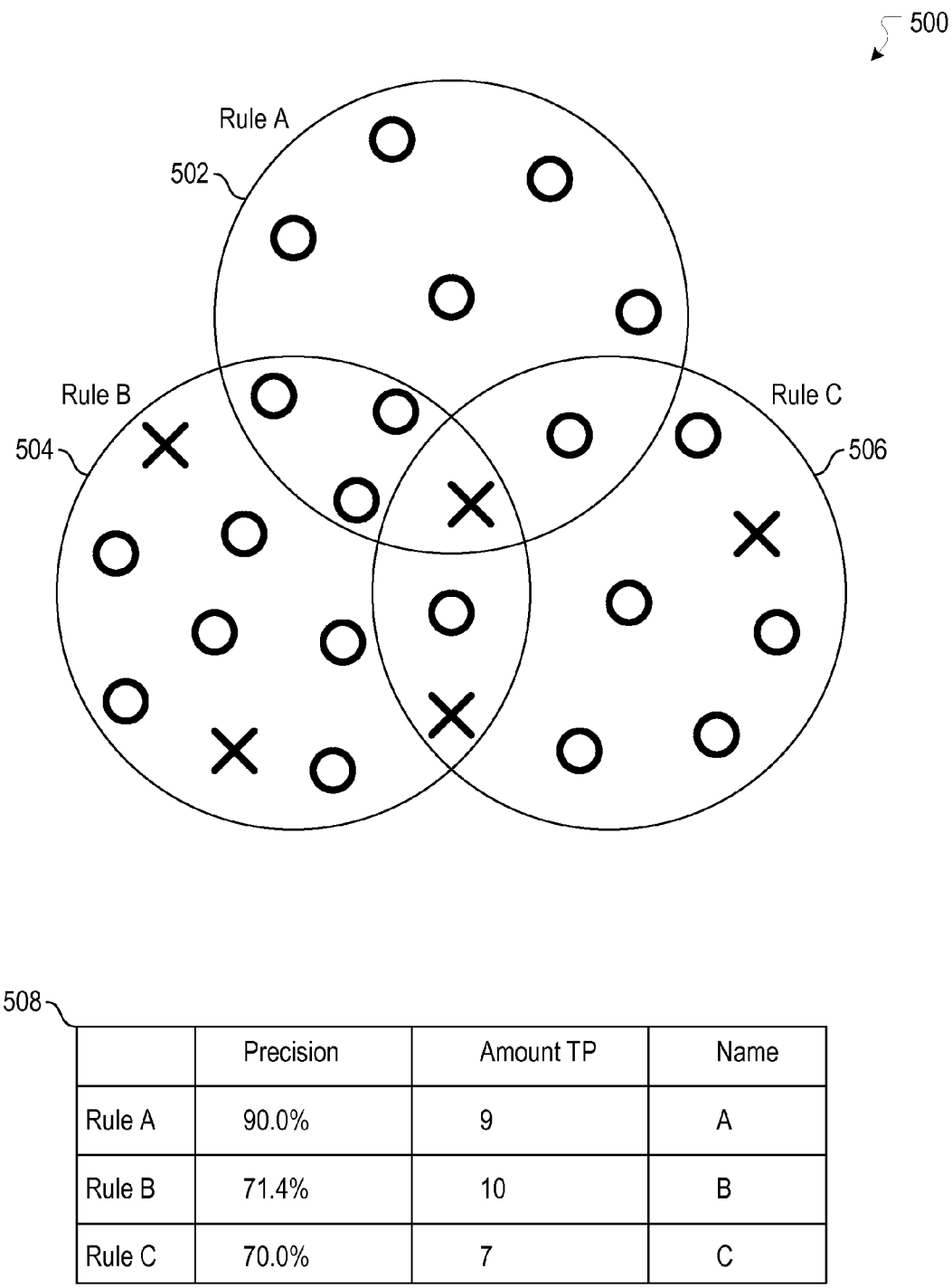
FIG. 5A illustrates an example scenario in which rules that identify potentially illegitimate activities can be ranked, according to an embodiment of the present disclosure.

FIG. 5A illustrates an example scenario 500 in which rules that identify potentially illegitimate activities can be ranked, according to an embodiment of the present disclosure. It should be noted that the example scenario 500 is provided for illustrative purposes. In some cases, there can be many more rules, activities, and/or complexities.

The example scenario 500 of FIG. 5A can include a diagram or graphical representation of three rules for identifying illegitimate activities as well as the activities identified by the three rules. In the diagram, the three rules can include Rule A 502, Rule B 504, and Rule C 506, each represented by a respective circle. The activities identified by the rules can be represented in the diagram as X's and O's. In this example, the O's can represent true positives, which can correspond to activities that have been identified as being illegitimate and also confirmed (e.g., via manual review, via end-user reports, etc.) as being illegitimate. The X's can represent false positives, which can correspond to activities that have been identified as being allegedly illegitimate but verified as being actually legitimate. The activities identified by a particular rule can be illustrated as being enclosed within the respective circle representative of the particular rule.

As shown in the diagram, Rule A 502 can identify a total of 10 activities, including nine true positives and one false positive. Rule B 504 can identify 14 activities, including 10 true positives and four false positives. Rule C 506 can identify 10 activities, including seven true positives and three false positives. Based on this information, it can be derived that Rule A 502 has a "Precision by Amount" value of 90% because Rule A 502 has correctly identified nine true positives out of 10 total identified activities. Rule A 502 also has a "True Positive Amount" or "Amount TP" value of nine because it has correctly identified nine true positive activities. Moreover, Rule A 502 has a "Name" value of "A." Rule B 504 has a "Precision by Amount" value of (approximately) 71.4% because Rule B 504 has a correctly identified 10 true positives out of 14 total identified activities. Rule B 504 has an "Amount TP" value of 10 and a "Name" value of "B". Further, Rule C 506 has a "Precision by Amount" value of 70%, an "Amount TP" value of seven, and a "Name" value of "C." As shown in the example of FIG. 5A, there can be overlap amongst rules. Multiple rules can identify one or more of the same activities, thereby creating redundancy and unnecessary complexity in the system. Without further analysis or review, it can be difficult to determine which rules are more efficient, effective, suitable, and/or desirable for identifying illegitimate activities and which rules are not.

Various embodiments of the present disclosure can provide a recursive process to rank the rules. As discussed above, in some embodiments, the rules can be ranked based on a priority order for a set of properties associated with the rules. In some instances, the priority order can be acquired from a user, an operator, and/or a configuration setting of the system. In the example of FIG. 5A, a table 508 can illustrate the acquired priority order for the set of properties associated with the rules. The table 508 can indicate that "Precision" (or "Precision by Amount") takes priority over "Amount TP," which takes priority over "Name." The table 508 also shows the set of Rules A, B, and C ranked based on the priority order. Rule A is ranked the highest since "Precision" is the highest prioritized property and Rule A has the highest "Precision" at 90%. Next is Rule B which has a "Precision" value of 71.4% (approximately), followed by Rule C with a "Precision" value of 70%. In some instances, these values can be referred to as absolute precision values.

As discussed previously, the highest ranked rule (i.e., Rule A) can be recorded as the next entry (or first entry in this example) in a record. The highest ranked Rule A and its identified activities can also be removed from consideration in the rule ranking process. The rule ranking process can then repeat recursively.

Figure 5B:
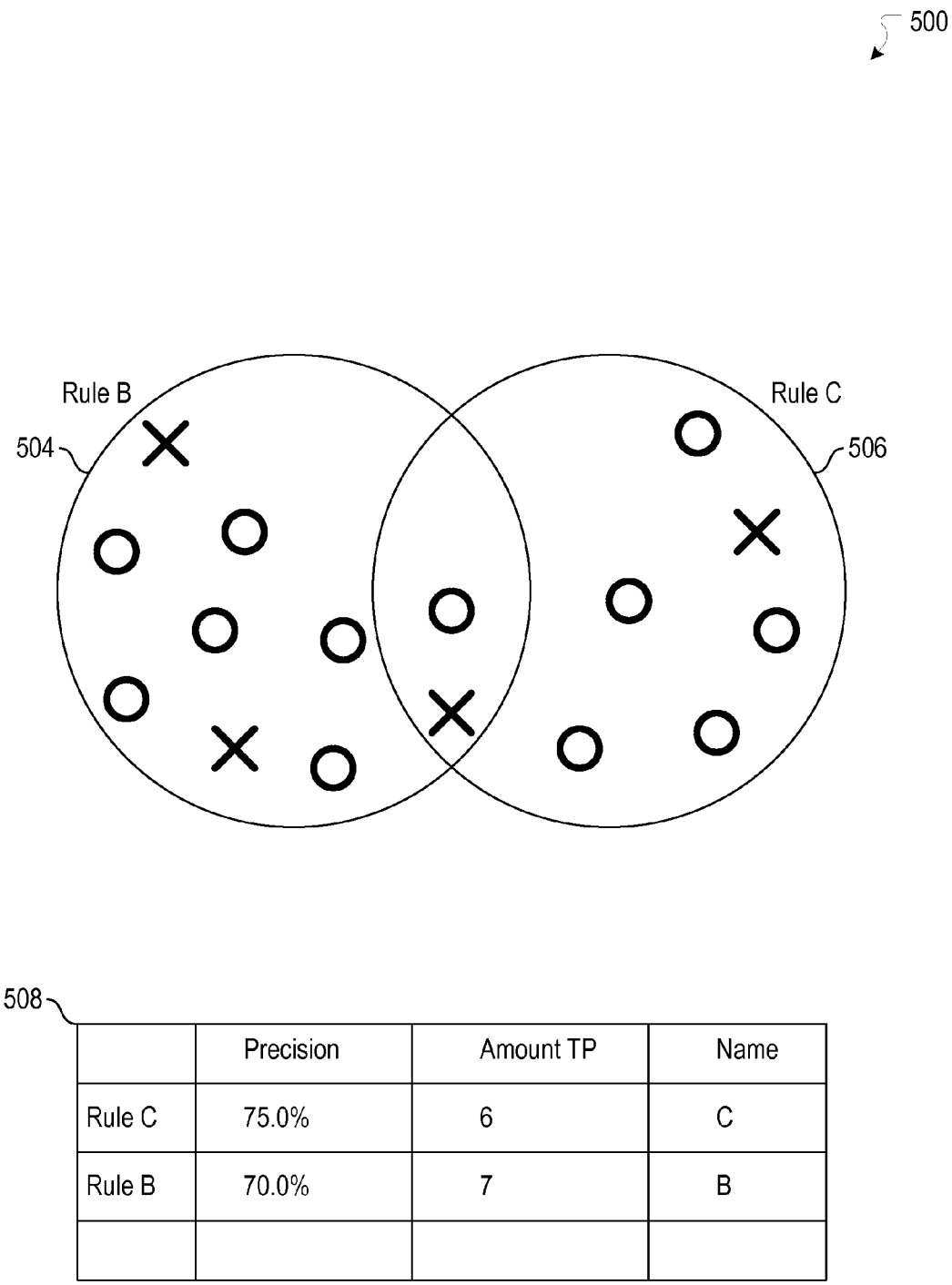
FIG. 5B illustrates the example scenario of FIG. 5A in which rules that identify potentially illegitimate activities can be ranked, according to an embodiment of the present disclosure.

FIG. 5B illustrates the example scenario 500 of FIG. 5A in which rules that identify potentially illegitimate activities can be ranked, according to an embodiment of the present disclosure. In the example of FIG. 5B, the next iteration in the recursive rule ranking process is shown.

In this example, Rule A has already been recorded in the record (or storage structure or storage element). Rule A and the activities identified by Rule A have also been removed from consideration, discounted, or disregarded in the recursive rule ranking process. Accordingly, the example scenario 500 of FIG. 5B illustrates the identification of 10 activities, including seven true positives and three false positives, as being attributed to Rule B 504. Moreover, Rule C 506 can identify eight activities, six of which are true positives and two of which are false positives. Accordingly, in this iteration, Rule B's "Precision" value corresponds to 7/10 or 70%. In some instances, this value can be referred to as an incremental precision value. Moreover, Rule C's "Precision" value corresponds to 6/8 or 75%. As such, Rule C can be ranked higher than Rule B based on the acquired priority order, which prioritizes "Precision" first, as shown in the table 508. It follows that Rule C can be stored as the next (second) entry in the record. Rule C and its identified activities can be removed from the rule ranking process in this iteration.

Figure 5C:
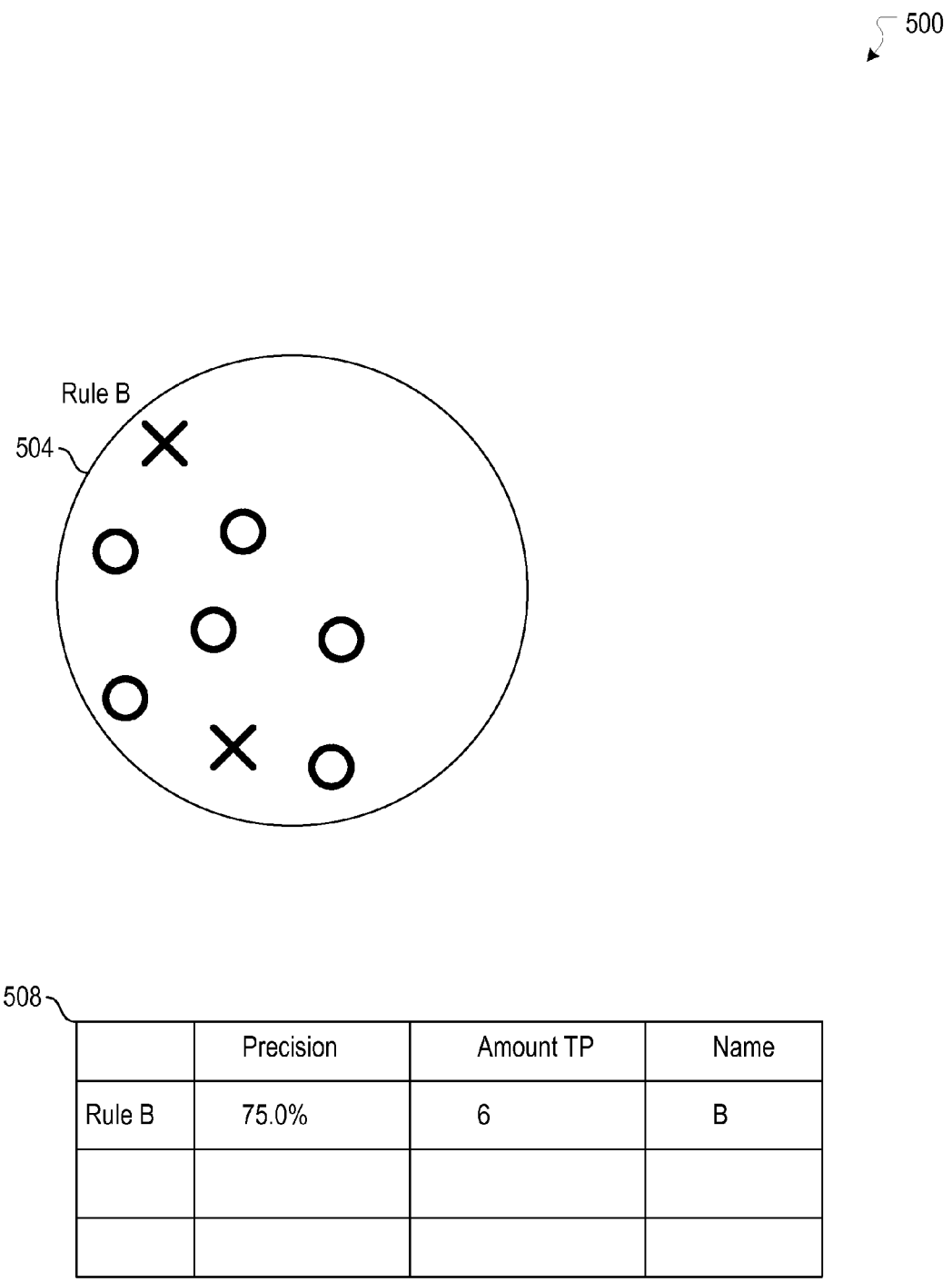
FIG. 5C illustrates the example scenario of FIG. 5B in which rules that identify potentially illegitimate activities can be ranked, according to an embodiment of the present disclosure.

FIG. 5C illustrates the example scenario 500 of FIG. 5B in which rules that identify potentially illegitimate activities can be ranked, according to an embodiment of the present disclosure. FIG. 5C illustrates the next iteration in the recursive rule ranking process after the iteration discussed with reference to FIG. 5B. In the example of FIG. 5C, Rule C has been recorded as the next (second) entry in the record. Rule C and the activities identified by Rule C have also been removed from consideration, discounted, or disregarded in the rule ranking process. The remaining Rule B 504 is shown as having identified eight activities, six of which are true positives and two of which are false positives. The "Precision" value for Rule B in this iteration is 6/8 or 75%. In some instances, this value can be referred to as an incremental precision value. Rule B is the only rule left in the set and thus is the highest ranked, as shown in the table 508. Rule B is recorded into the record as the next (third) entry. Rule B and its identified activities can be removed from consideration, thus emptying the set of rules and completing the recursive rule ranking process.

Figure 5D:
FIG. 5D illustrates an example record for storing ranked rules that identify potentially illegitimate activities, according to an embodiment of the present disclosure.

FIG. 5D illustrates an example record 550 for storing ranked rules that identify potentially illegitimate activities, according to an embodiment of the present disclosure. As shown in FIG. 5D, the example record 550 can correspond to a list, sequence, or order for storing the ranked rules. The completed rankings show Rule A as being ranked the highest based on the priority order, followed by Rule C, and then by Rule B. The example record 550 can also store one or more properties (e.g., "Precision," "Amount TP," "Name," etc.) for each rule.

Figure 6A:
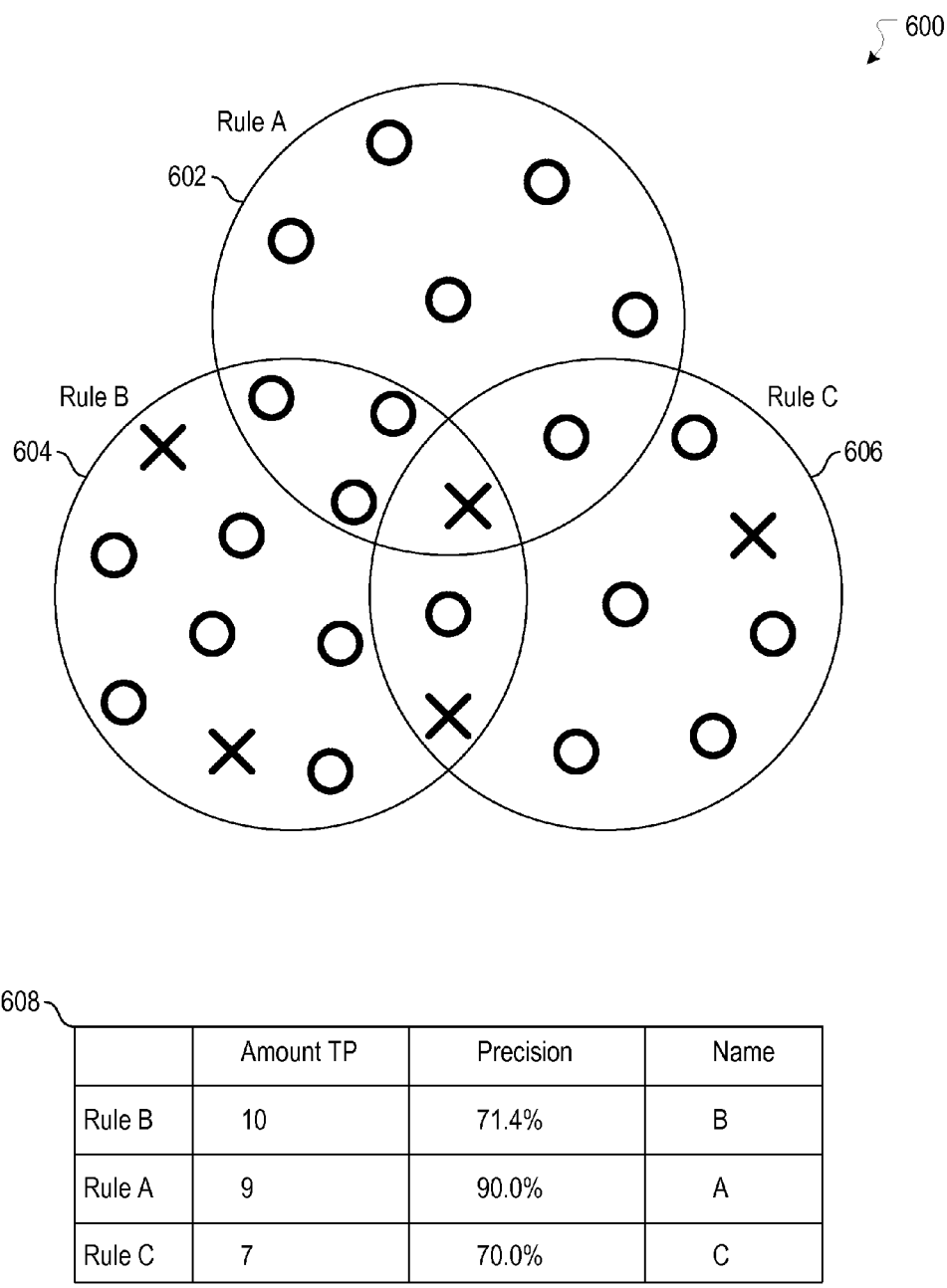
FIG. 6A illustrates an example scenario in which rules that identify potentially illegitimate activities can be ranked, according to an embodiment of the present disclosure.

FIG. 6A illustrates an example scenario 600 in which rules that identify potentially illegitimate activities can be ranked, according to an embodiment of the present disclosure. As shown in the example diagram or graphical representation of FIG. 6A, Rule A 602 can identify a total of 10 activities, including nine true positives and one false positive. Rule B 604 can identify 14 activities, including 10 true positives and four false positives. Rule C 606 can identify 10 activities, including seven true positives and three false positives. Based on this information, Rule A 602 has a "Precision by Amount" value of 90% because Rule A 602 has correctly identified nine true positives out of 10 total identified activities. Rule A 602 has a "True Positive Amount" or "Amount TP" value of nine because it has correctly identified nine activities. Rule A 602 also has a "Name" value of "A." Moreover, Rule B 604 has a "Precision by Amount" value of (approximately) 71.4% because Rule B 604 has a correctly identified 10 true positives out of 14 total identified activities. Rule B 604 also has an "Amount TP" value of 10 and a "Name" value of "B". Rule C 606 has a "Precision by Amount" value of 70%, an "Amount TP" value of seven, and a "Name" value of "C."

In the example of FIG. 6A, a table 608 can provide an acquired priority order for the set of properties associated with the rules. The table 608 can indicate that "Amount TP" takes priority over "Precision" (or "Precision by Amount"), which takes priority over "Name." The table 608 also shows the set of Rules A, B, and C ranked based on the priority order. Rule B is ranked the highest since "Amount TP" is the highest prioritized property and Rule B has the highest "Amount TP" value at 10. Next is Rule A which has an "Amount TP" value of nine, followed by Rule C with an "Amount TP" value of seven. As such, the highest ranked Rule B can be stored in a record as the next (first) entry. Rule B and its identified activities can be removed from consideration in the ranking process.

Figure 6B:
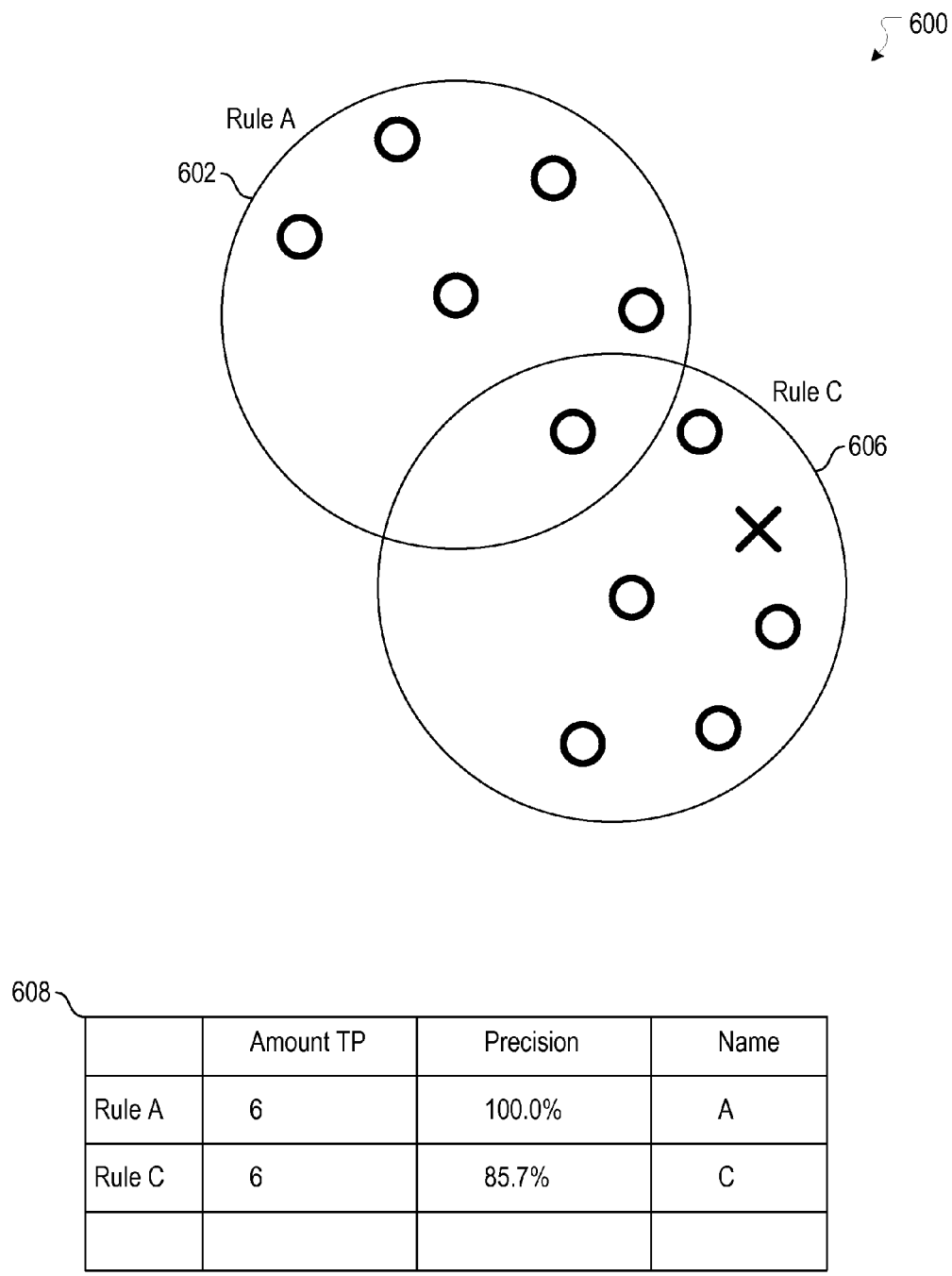
FIG. 6B illustrates the example scenario of FIG. 6A in which rules that identify potentially illegitimate activities can be ranked, according to an embodiment of the present disclosure.

FIG. 6B illustrates the example scenario 600 of FIG. 6A in which rules that identify potentially illegitimate activities can be ranked, according to an embodiment of the present disclosure. In the example of FIG. 6B, Rule B has already been recorded. Rule B and its identified activities have also been removed from consideration. In this example, Rule A 602 can identify six true positive activities and zero false positive activities, thus resulting in Rule A having an "Amount TP" value of six and a "Precision" value of 6/6 or 100%. Rule C 606 can identify six true positive activities and one false positive activity, thus resulting in Rule C having an "Amount TP" value of six and a "Precision" value of 6/7 or 85.7% (approximately).

The rule ranking process can compare Rule A and Rule C. It can be determined that Rule A and Rule C are tied with respect to their "Amount TP" values. Since the next property (after "Amount TP") in the priority order is "Precision," Rules A and C can then be compared based on their "Precision" values. Rule A has a "Precision" of 100% whereas Rule C has a "Precision" of 85.7%. As such, Rule A can be ranked higher than Rule C in this iteration of the ranking process, as shown in the table 608. Rule A can be recorded as the next (second) entry in the record. Rule A and its identified activities can be removed from consideration in the ranking process.

Figure 6C:
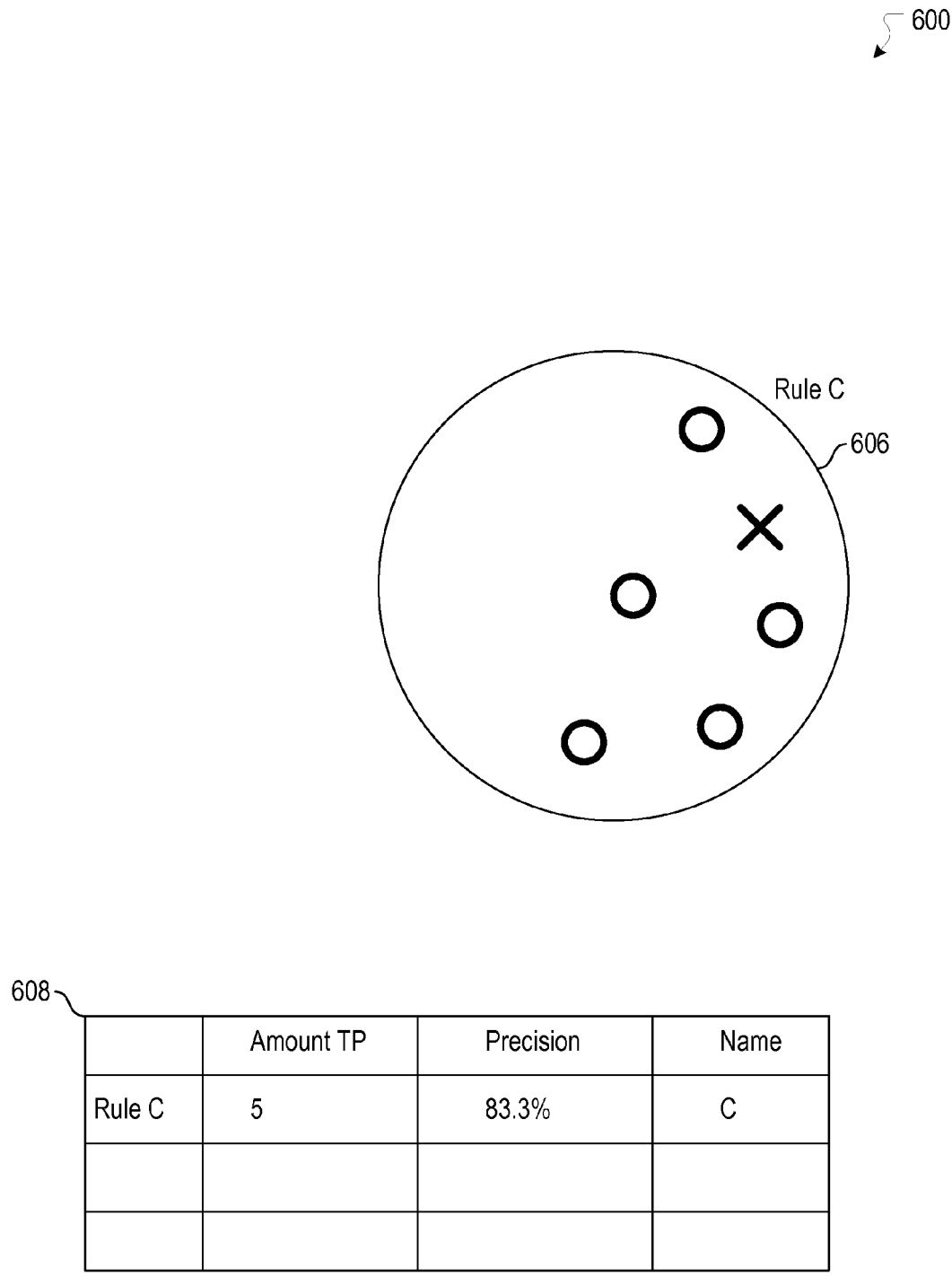
FIG. 6C illustrates the example scenario of FIG. 6B in which rules that identify potentially illegitimate activities can be ranked, according to an embodiment of the present disclosure.

FIG. 6C illustrates the example scenario 600 of FIG. 6B in which rules that identify potentially illegitimate activities can be ranked, according to an embodiment of the present disclosure. In the example of FIG. 6C, the remaining Rule C 606 is shown as having identified six activities, five of which are true positives and one of which is a false positive.

The "Amount TP" value for Rule C in this iteration is five. Rule C is the only rule left in the set and thus is the highest ranked, as shown in the table 608. Rule C is recorded into the record as the next (third) entry. Rule C and its identified activities can be removed from consideration, thus emptying the set of rules and completing the recursive ranking process.

FIG. 6D illustrates an example record 650 for storing ranked rules that identify potentially illegitimate activities, according to an embodiment of the present disclosure. As shown in FIG. 6D, the example record 650 can correspond to a list, sequence, or order for storing the ranked rules. The completed rankings show Rule B as being ranked the highest based on the priority order, followed by Rule A, and then by Rule C. The example record 650 can also store one or more properties (e.g., "Amount TP," "Precision," "Name," etc.) for each rule.

Figure 7:
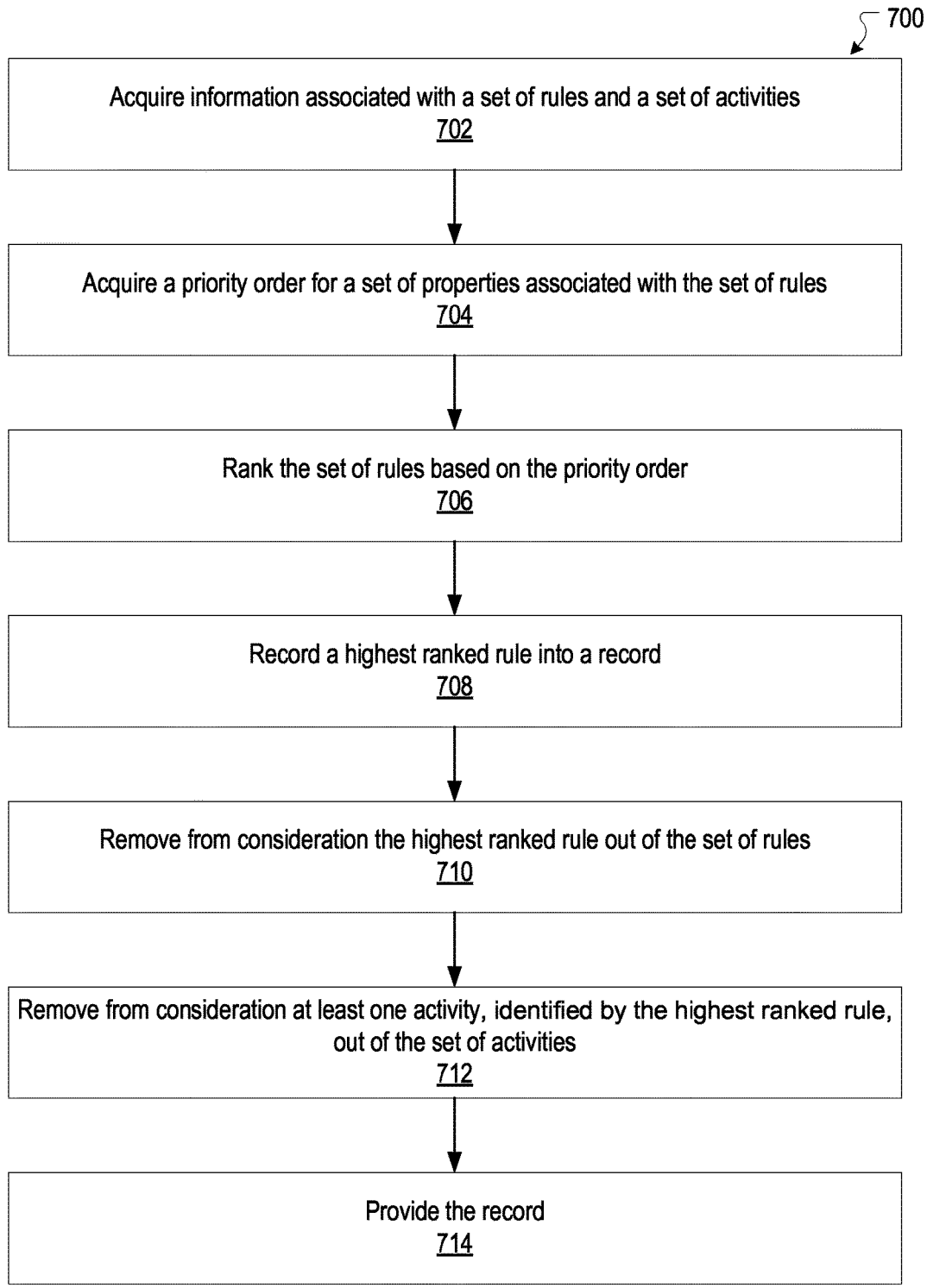
FIG. 7 illustrates an example method for ranking rules that identify potentially illegitimate activities, according to an embodiment of the present disclosure.

FIG. 7 illustrates an example method 700 for ranking rules that identify potentially illegitimate activities, according to an embodiment of the present disclosure. It should be appreciated that there can be additional, fewer, or alternative steps performed in similar or alternative orders, or in parallel, within the scope of the various embodiments unless otherwise stated.

At block 702, the example method 700 can acquire information associated with a set of rules and a set of activities identified by the set of rules as being potentially illegitimate. For example, the information can be acquired from a database (e.g., action database) of a system for identifying illegitimate activities.

At block 704, the example method 700 can acquire a priority order for a set of properties associated with the set of rules. In some embodiments, the priority order can be acquired based on a user instruction, a system instruction, and/or a defined setting, etc.

At block 706, the example method 700 can rank the set of rules based on the priority order. For example, the priority order can cause the set of rules to be ranked based on their respective values for a first property, based on their respective values for a second property when their values for the first property are tied, based on their respective values for a third property when their values for the second property are tied, and so forth.

At block 708, the example method 700 can store a highest ranked rule into a record. For example, the highest ranked rule can be placed or stored, at least temporarily, as the next highest entry in the record (or storage structure or element).

At block 710, the example method 700 can remove from consideration the highest ranked rule out of the set of rules. At block 712, the example method 700 can remove from consideration at least one activity, identified by the highest ranked rule, out of the set of activities. Then at block 714, the example method 700 can provide the record, such as in a report and/or communication.

Moreover, in some embodiments, the removing of the highest ranked rule out of the set of rules can produce a subset of rules and the removing of the at least one activity out of the set of activities can produce a subset of activities.

Figure 8:
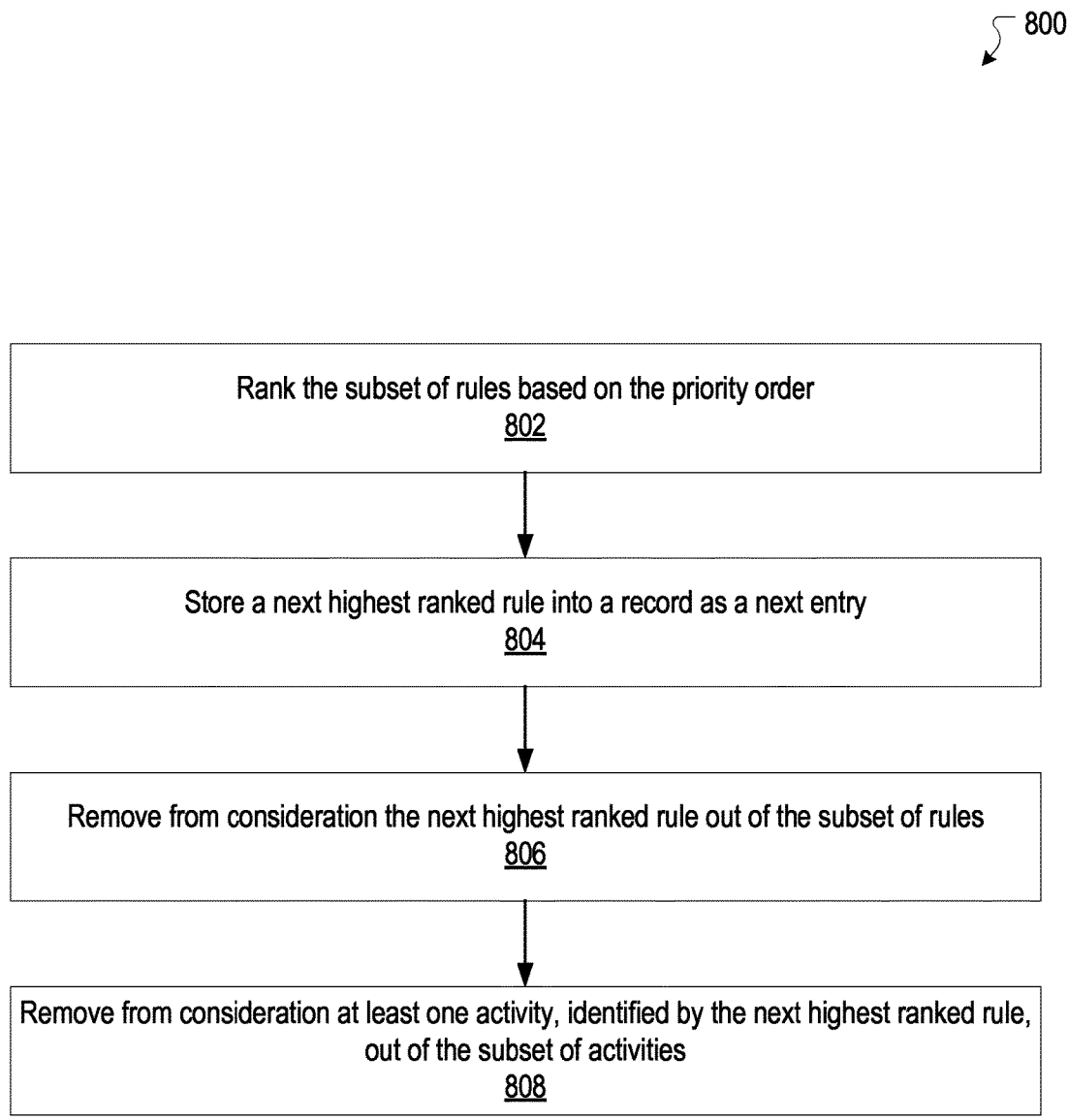
FIG. 8 illustrates an example method for ranking rules that identify potentially illegitimate activities, according to an embodiment of the present disclosure.

FIG. 8 illustrates an example method 800 for ranking rules that identify potentially illegitimate activities, according to an embodiment of the present disclosure. Again, it should be appreciated that there can be additional, fewer, or alternative steps performed in similar or alternative orders, or in parallel, within the scope of the various embodiments unless otherwise stated. As discussed above, in some embodiments, removing a highest ranked rule out of a set of rules can produce a subset of rules and removing at least one activity, identified by the removed highest ranked rule, out of a set of activities can produce a subset of activities.

At block 802, the example method 800 can rank the subset of rules based on the priority order. At block 804, the example method 800 can store a next highest ranked rule into the record as a next entry. At block 806, the example method 800 can remove from consideration the next highest ranked rule out of the subset of rules. At block 808, the example method 800 can remove from consideration at least one activity, identified by the next highest ranked rule, out of the subset of activities.

In some embodiments, the ranking of the subset of rules, the storing of the next highest ranked rule into the record, the removing of the next highest ranked rule out of the subset of rules, and the removing of the at least one activity out of the subset of activities can be performed repeatedly until no rules are left in the subset of rules. In some implementations, the ranking of the subset of rules, the storing of the next highest ranked rule into the record, the removing of the next highest ranked rule out of the subset of rules, and the removing of the at least one activity out of the subset of activities can be performed prior to the providing of the record.

In some implementations, the values of the properties for the rules can be scaled based on scale factors and/or weighted based on weight factors.

It is further contemplated that there can be many other uses, applications, and/or variations associated with the various embodiments of the present disclosure.

Social Networking System—Example Implementation

Figure 9:
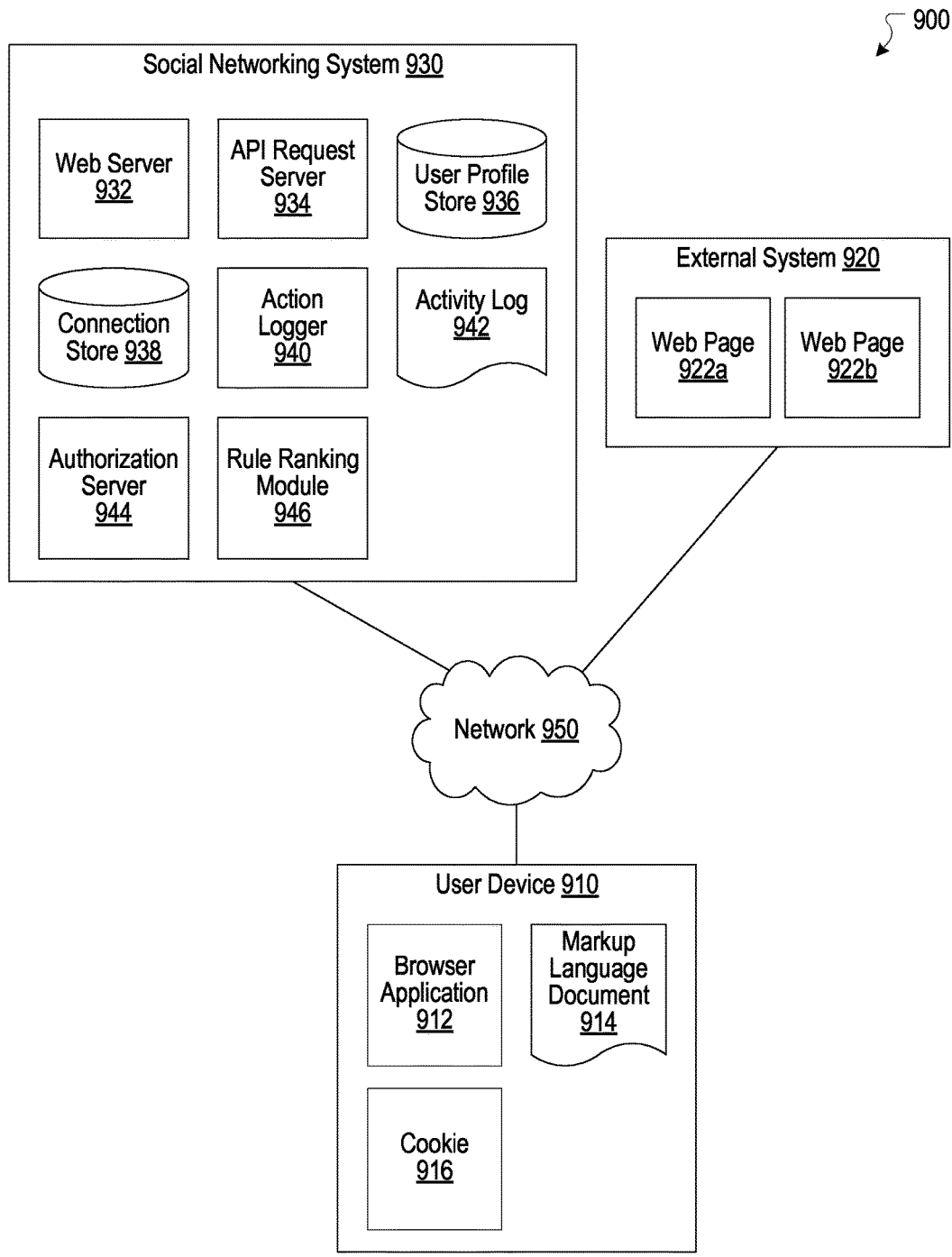
FIG. 9 illustrates a network diagram of an example system that can be utilized in various scenarios, according to an embodiment of the present disclosure.

FIG. 9 illustrates a network diagram of an example system 900 that can be utilized in various embodiments for enhanced video encoding, in accordance with an embodiment of the present disclosure. The system 900 includes one or more user devices 910, one or more external systems 920, a social networking system 930, and a network 950. In an embodiment, the social networking service, provider, and/or system discussed in connection with the embodiments described above may be implemented as the social networking system 930. For purposes of illustration, the embodiment of the system 900, shown by FIG. 9, includes a single external system 920 and a single user device 910. However, in other embodiments, the system 900 may include more user devices 910 and/or more external systems 920. In certain embodiments, the social networking system 930 is operated by a social network provider, whereas the external systems 920 are separate from the social networking system 930 in that they may be operated by different entities. In various embodiments, however, the social networking system 930 and the external systems 920 operate in conjunction to provide social networking services to users (or members) of the social networking system 930. In this sense, the social networking system 930 provides a platform or backbone, which other systems, such as external systems 920, may use to provide social networking services and functionalities to users across the Internet.

The user device 910 comprises one or more computing devices that can receive input from a user and transmit and receive data via the network 950. In one embodiment, the user device 910 is a conventional computer system executing, for example, a Microsoft Windows compatible operating system (OS), Apple OS X, and/or a Linux distribution. In another embodiment, the user device 910 can be a device having computer functionality, such as a smart-phone, a tablet, a personal digital assistant (PDA), a mobile telephone, etc. The user device 910 is configured to communicate via the network 950. The user device 910 can execute an application, for example, a browser application that allows a user of the user device 910 to interact with the social networking system 930. In another embodiment, the user device 910 interacts with the social networking system 930 through an application programming interface (API) provided by the native operating system of the user device 910, such as iOS and ANDROID. The user device 910 is configured to communicate with the external system 920 and the social networking system 930 via the network 950, which may comprise any combination of local area and/or wide area networks, using wired and/or wireless communication systems.

In one embodiment, the network 950 uses standard communications technologies and protocols. Thus, the network 950 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 950 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 950 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 910 may display content from the external system 920 and/or from the social networking system 930 by processing a markup language document 914 received from the external system 920 and from the social networking system 930 using a browser application 912. The markup language document 914 identifies content and one or more instructions describing formatting or presentation of the content. By executing the instructions included in the markup language document 914, the browser application 912 displays the identified content using the format or presentation described by the markup language document 914. For example, the markup language document 914 includes instructions for generating and displaying a web page having multiple frames that include text and/or image data retrieved from the external system 920 and the social networking system 930. In various embodiments, the markup language document 914 comprises a data file including extensible markup language (XML) data, extensible hypertext markup language (XHTML) data, or other markup language data. Additionally, the markup language document 914 may include JavaScript Object Notation (JSON) data, JSON with padding (JSONP), and JavaScript data to facilitate data-interchange between the external system 920 and the user device 910. The browser application 912 on the user device 910 may use a JavaScript compiler to decode the markup language document 914.

The markup language document 914 may also include, or link to, applications or application frameworks such as FLASH™ or Unity™ applications, the SilverLight™ application framework, etc.

In one embodiment, the user device 910 also includes one or more cookies 916 including data indicating whether a user of the user device 910 is logged into the social networking system 930, which may enable modification of the data communicated from the social networking system 930 to the user device 910.

The external system 920 includes one or more web servers that include one or more web pages 922a, 922b, which are communicated to the user device 910 using the network 950. The external system 920 is separate from the social networking system 930. For example, the external system 920 is associated with a first domain, while the social networking system 930 is associated with a separate social networking domain. Web pages 922a, 922b, included in the external system 920, comprise markup language documents 914 identifying content and including instructions specifying formatting or presentation of the identified content.

The social networking system 930 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 930 may be administered, managed, or controlled by an operator. The operator of the social networking system 930 may be a human being, an automated application, or a series of applications for managing content, regulating policies, and collecting usage metrics within the social networking system 930. Any type of operator may be used.

Users may join the social networking system 930 and then add connections to any number of other users of the social networking system 930 to whom they desire to be connected. As used herein, the term "friend" refers to any other user of the social networking system 930 to whom a user has formed a connection, association, or relationship via the social networking system 930. For example, in an embodiment, if users in the social networking system 930 are represented as nodes in the social graph, the term "friend" can refer to an edge formed between and directly connecting two user nodes.

Connections may be added explicitly by a user or may be automatically created by the social networking system 930 based on common characteristics of the users (e.g., users who are alumni of the same educational institution). For example, a first user specifically selects a particular other user to be a friend. Connections in the social networking system 930 are usually in both directions, but need not be, so the terms "user" and "friend" depend on the frame of reference. Connections between users of the social networking system 930 are usually bilateral ("two-way"), or "mutual," but connections may also be unilateral, or "one-way." For example, if Bob and Joe are both users of the social networking system 930 and connected to each other, Bob and Joe are each other's connections. If, on the other hand, Bob wishes to connect to Joe to view data communicated to the social networking system 930 by Joe, but Joe does not wish to form a mutual connection, a unilateral connection may be established. The connection between users may be a direct connection; however, some embodiments of the social networking system 930 allow the connection to be indirect via one or more levels of connections or degrees of separation.

In addition to establishing and maintaining connections between users and allowing interactions between users, the social networking system 930 provides users with the ability to take actions on various types of items supported by the social networking system 930. These items may include groups or networks (i.e., social networks of people, entities, and concepts) to which users of the social networking system 930 may belong, events or calendar entries in which a user might be interested, computer-based applications that a user may use via the social networking system 930, transactions that allow users to buy or sell items via services provided by or through the social networking system 930, and interactions with advertisements that a user may perform on or off the social networking system 930. These are just a few examples of the items upon which a user may act on the social networking system 930, and many others are possible. A user may interact with anything that is capable of being represented in the social networking system 930 or in the external system 920, separate from the social networking system 930, or coupled to the social networking system 930 via the network 950.

The social networking system 930 is also capable of linking a variety of entities. For example, the social networking system 930 enables users to interact with each other as well as external systems 920 or other entities through an API, a web service, or other communication channels. The social networking system 930 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 930. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 930 modifies edges connecting the various nodes to reflect the relationships and interactions.

The social networking system 930 also includes user-generated content, which enhances a user's interactions with the social networking system 930. User-generated content may include anything a user can add, upload, send, or "post" to the social networking system 930. For example, a user communicates posts to the social networking system 930 from a user device 910. Posts may include data such as status updates or other textual data, location information, images such as photos, videos, links, music or other similar data and/or media. Content may also be added to the social networking system 930 by a third party. Content "items" are represented as objects in the social networking system 930. In this way, users of the social networking system 930 are encouraged to communicate with each other by posting text and content items of various types of media through various communication channels. Such communication increases the interaction of users with each other and increases the frequency with which users interact with the social networking system 930.

The social networking system 930 includes a web server 932, an API request server 934, a user profile store 936, a connection store 938, an action logger 940, an activity log 942, and an authorization server 944. In an embodiment of the invention, the social networking system 930 may include additional, fewer, or different components for various applications. Other components, such as network interfaces, security mechanisms, load balancers, failover servers, management and network operations consoles, and the like are not shown so as to not obscure the details of the system.

The user profile store 936 maintains information about user accounts, including biographic, demographic, and other types of descriptive information, such as work experience, educational history, hobbies or preferences, location, and the like that has been declared by users or inferred by the social networking system 930. This information is stored in the user profile store 936 such that each user is uniquely identified. The social networking system 930 also stores data describing one or more connections between different users in the connection store 938. The connection information may indicate users who have similar or common work experience, group memberships, hobbies, or educational history. Additionally, the social networking system 930 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 930, such as non-person entities, buckets, cluster centers, images, interests, pages, external systems, concepts, and the like are also stored in the connection store 938.

The social networking system 930 maintains data about objects with which a user may interact. To maintain this data, the user profile store 936 and the connection store 938 store instances of the corresponding type of objects maintained by the social networking system 930. Each object type has information fields that are suitable for storing information appropriate to the type of object. For example, the user profile store 936 contains data structures with fields suitable for describing a user's account and information related to a user's account. When a new object of a particular type is created, the social networking system 930 initializes a new data structure of the corresponding type, assigns a unique object identifier to it, and begins to add data to the object as needed. This might occur, for example, when a user becomes a user of the social networking system 930, the social networking system 930 generates a new instance of a user profile in the user profile store 936, assigns a unique identifier to the user account, and begins to populate the fields of the user account with information provided by the user.

The connection store 938 includes data structures suitable for describing a user's connections to other users, connections to external systems 920 or connections to other entities. The connection store 938 may also associate a connection type with a user's connections, which may be used in conjunction with the user's privacy setting to regulate access to information about the user. In an embodiment of the invention, the user profile store 936 and the connection store 938 may be implemented as a federated database.

Data stored in the connection store 938, the user profile store 936, and the activity log 942 enables the social networking system 930 to generate the social graph that uses nodes to identify various objects and edges connecting nodes to identify relationships between different objects. For example, if a first user establishes a connection with a second user in the social networking system 930, user accounts of the first user and the second user from the user profile store 936 may act as nodes in the social graph. The connection between the first user and the second user stored by the connection store 938 is an edge between the nodes associated with the first user and the second user. Continuing this example, the second user may then send the first user a message within the social networking system 930. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 930 (or, alternatively, in an image maintained by another system outside of the social networking system 930). The image may itself be represented as a node in the social networking system 930. This tagging action may create edges between the first user and the second user as well as create an edge between each of the users and the image, which is also a node in the social graph. In yet another example, if a user confirms attending an event, the user and the event are nodes obtained from the user profile store 936, where the attendance of the event is an edge between the nodes that may be retrieved from the activity log 942. By generating and maintaining the social graph, the social networking system 930 includes data describing many different types of objects and the interactions and connections among those objects, providing a rich source of socially relevant information.

The web server 932 links the social networking system 930 to one or more user devices 910 and/or one or more external systems 920 via the network 950. The web server 932 serves web pages, as well as other web-related content, such as Java, JavaScript, Flash, XML, and so forth. The web server 932 may include a mail server or other messaging functionality for receiving and routing messages between the social networking system 930 and one or more user devices 910. The messages can be instant messages, queued messages (e.g., email), text and SMS messages, or any other suitable messaging format.

The API request server 934 allows one or more external systems 920 and user devices 910 to call access information from the social networking system 930 by calling one or more API functions. The API request server 934 may also allow external systems 920 to send information to the social networking system 930 by calling APIs. The external system 920, in one embodiment, sends an API request to the social networking system 930 via the network 950, and the API request server 934 receives the API request. The API request server 934 processes the request by calling an API associated with the API request to generate an appropriate response, which the API request server 934 communicates to the external system 920 via the network 950. For example, responsive to an API request, the API request server 934 collects data associated with a user, such as the user's connections that have logged into the external system 920, and communicates the collected data to the external system 920. In another embodiment, the user device 910 communicates with the social networking system 930 via APIs in the same manner as external systems 920.

The action logger 940 is capable of receiving communications from the web server 932 about user actions on and/or off the social networking system 930. The action logger 940 populates the activity log 942 with information about user actions, enabling the social networking system 930 to discover various actions taken by its users within the social networking system 930 and outside of the social networking system 930. Any action that a particular user takes with respect to another node on the social networking system 930 may be associated with each user's account, through information maintained in the activity log 942 or in a similar database or other data repository. Examples of actions taken by a user within the social networking system 930 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 930, the action is recorded in the activity log 942. In one embodiment, the social networking system 930 maintains the activity log 942 as a database of entries. When an action is taken within the social networking system 930, an entry for the action is added to the activity log 942. The activity log 942 may be referred to as an action log.

Additionally, user actions may be associated with concepts and actions that occur within an entity outside of the social networking system 930, such as an external system 920 that is separate from the social networking system 930. For example, the action logger 940 may receive data describing a user's interaction with an external system 920 from the web server 932. In this example, the external system 920 reports a user's interaction according to structured actions and objects in the social graph.

Other examples of actions where a user interacts with an external system 920 include a user expressing an interest in an external system 920 or another entity, a user posting a comment to the social networking system 930 that discusses an external system 920 or a web page 922a within the external system 920, a user posting to the social networking system 930 a Uniform Resource Locator (URL) or other identifier associated with an external system 920, a user attending an event associated with an external system 920, or any other action by a user that is related to an external system 920. Thus, the activity log 942 may include actions describing interactions between a user of the social networking system 930 and an external system 920 that is separate from the social networking system 930.

The authorization server 944 enforces one or more privacy settings of the users of the social networking system 930. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 920, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 920. One embodiment allows the specification of the set of entities to comprise an enumeration of entities. For example, the user may provide a list of external systems 920 that are allowed to access certain information. Another embodiment allows the specification to comprise a set of entities along with exceptions that are not allowed to access the information. For example, a user may allow all external systems 920 to access the user's work information, but specify a list of external systems 920 that are not allowed to access the work information. Certain embodiments call the list of exceptions that are not allowed to access certain information a "block list". External systems 920 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 944 contains logic to determine if certain information associated with a user can be accessed by a user's friends, external systems 920, and/or other applications and entities. The external system 920 may need authorization from the authorization server 944 to access the user's more private and sensitive information, such as the user's work phone number. Based on the user's privacy settings, the authorization server 944 determines if another user, the external system 920, an application, or another entity is allowed to access information associated with the user, including information about actions taken by the user.

The social networking system 930 can include a rule ranking module 946. In some embodiments, the rule ranking module 946 can be implemented as the rule ranking module 102 of FIG. 1. The rule ranking module 946 can be configured to facilitate ranking rules that identify potentially illegitimate activities. For example, the rule ranking module 946 can acquire information associated with a set of rules and a set of activities identified by the set of rules as being potentially illegitimate. The rule ranking module 946 can acquire a priority order for a set of properties associated with the set of rules. The rule ranking module 946 can rank the set of rules based on the priority order. Furthermore, the rule ranking module 946 can store a highest ranked rule into a record. The rule ranking module 946 can remove from consideration the highest ranked rule out of the set of rules. Moreover, the rule ranking module 946 can remove from consideration at least one activity, identified by the highest ranked rule, out of the set of activities. The rule ranking module 946 can also provide the record, such as by presenting at least a portion of the record or generating a report or communication.

Hardware Implementation

Figure 10:
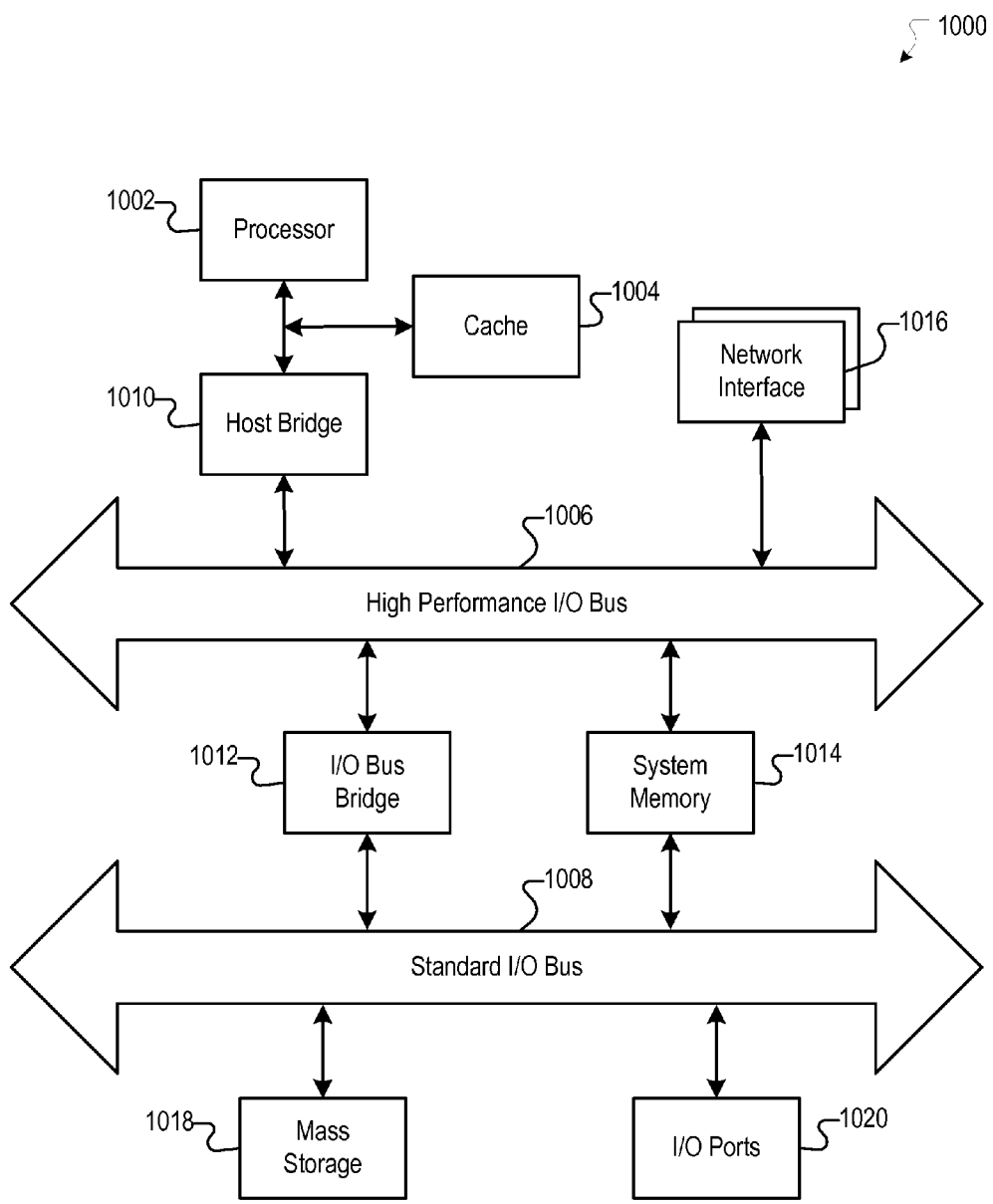
FIG. 10 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 10 illustrates an example of a computer system 1000 that may be used to implement one or more of the embodiments described herein in accordance with an embodiment of the invention. The computer system 1000 includes sets of instructions for causing the computer system 1000 to perform the processes and features discussed herein. The computer system 1000 may be connected (e.g., networked) to other machines. In a networked deployment, the computer system 1000 may operate in the capacity of a server machine or a client machine in a client-server network environment, or as a peer machine in a peer-to-peer (or distributed) network environment. In an embodiment of the invention, the computer system 1000 may be the social networking system 1030, the user device 910, and the external system 1020, or a component thereof. In an embodiment of the invention, the computer system 1000 may be one server among many that constitutes all or part of the social networking system 1030.

The computer system 1000 includes a processor 1002, a cache 1004, and one or more executable modules and drivers, stored on a computer-readable medium, directed to the processes and features described herein. Additionally, the computer system 1000 includes a high performance input/output (I/O) bus 1006 and a standard I/O bus 1008. A host bridge 1010 couples processor 1002 to high performance I/O bus 1006, whereas I/O bus bridge 1012 couples the two buses 1006 and 1008 to each other. A system memory 1014 and one or more network interfaces 1016 couple to high performance I/O bus 1006. The computer system 1000 may further include video memory and a display device coupled to the video memory (not shown). Mass storage 1018 and I/O ports 1020 couple to the standard I/O bus 1008. The computer system 1000 may optionally include a keyboard and pointing device, a display device, or other input/output devices (not shown) coupled to the standard I/O bus 1008. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 1000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 1000 are described in greater detail below. In particular, the network interface 1016 provides communication between the computer system 1000 and any of a wide range of networks, such as an Ethernet (e.g., IEEE 802.3) network, a backplane, etc. The mass storage 1018 provides permanent storage for the data and programming instructions to perform the above-described processes and features implemented by the respective computing systems identified above, whereas the system memory 1014 (e.g., DRAM) provides temporary storage for the data and programming instructions when executed by the processor 1002. The I/O ports 1020 may be one or more serial and/or parallel communication ports that provide communication between additional peripheral devices, which may be coupled to the computer system 1000.

The computer system 1000 may include a variety of system architectures, and various components of the computer system 1000 may be rearranged. For example, the cache 1004 may be on-chip with processor 1002. Alternatively, the cache 1004 and the processor 1002 may be packed together as a "processor module", with processor 1002 being referred to as the "processor core". Furthermore, certain embodiments of the invention may neither require nor include all of the above components. For example, peripheral devices coupled to the standard I/O bus 1008 may couple to the high performance I/O bus 1006. In addition, in some embodiments, only a single bus may exist, with the components of the computer system 1000 being coupled to the single bus. Moreover, the computer system 1000 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 1000 that, when read and executed by one or more processors, cause the computer system 1000 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1000, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 1002. Initially, the series of instructions may be stored on a storage device, such as the mass storage 1018. However, the series of instructions can be stored on any suitable computer readable storage medium. Furthermore, the series of instructions need not be stored locally, and could be received from a remote storage device, such as a server on a network, via the network interface 1016. The instructions are copied from the storage device, such as the mass storage 1018, into the system memory 1014 and then accessed and executed by the processor 1002. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1000 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed:

1. A computer-implemented method comprising:
  acquiring, by a computing system, information associated with a set of rules and a set of activities identified by the set of rules as being potentially illegitimate;
  acquiring, by the computing system, a priority order for a set of properties associated with the set of rules, wherein the set of properties includes at least a first property and a second property, and wherein the priority order prioritizes the first property over the second property;
  ranking, by the computing system, the set of rules based on the priority order;
  storing, by the computing system, a highest ranked rule into a record;
  removing from consideration, by the computing system, the highest ranked rule out of the set of rules;
  removing from consideration, by the computing system, at least one activity, identified by the highest ranked rule, out of the set of activities; and
  providing, by the computing system, the record.

2. The computer-implemented method of claim 1, wherein the removing of the highest ranked rule out of the set of rules produces a subset of rules, and wherein the removing of the at least one activity out of the set of activities produces a subset of activities.

3. The computer-implemented method of claim 2, further comprising:
   ranking the subset of rules based on the priority order;
   storing a next highest ranked rule into the record as a next entry;
   removing from consideration the next highest ranked rule out of the subset of rules; and
   removing from consideration at least one activity, identified by the next highest ranked rule, out of the subset of activities.

4. The computer-implemented method of claim 3, wherein the ranking of the subset of rules, the storing of the next highest ranked rule into the record, the removing of the next highest ranked rule out of the subset of rules, and the removing of the at least one activity out of the subset of activities are performed repeatedly until no rules are left in the subset of rules.

5. The computer-implemented method of claim 4, wherein the ranking of the subset of rules, the storing of the next highest ranked rule into the record, the removing of the next highest ranked rule out of the subset of rules, and the removing of the at least one activity out of the subset of activities are performed prior to the providing of the record.

6. The computer-implemented method of claim 1, wherein the providing of the record corresponds to at least one of presenting at least a portion of data included in the record, generating a report based on the at the portion of data included in the record, or transmitting a communication based on the at the portion of the data included in the record.

7. The computer-implemented method of claim 1, wherein the acquiring of the priority order is based on at least one of a user instruction, a system instruction, or a defined setting.

8. The computer-implemented method of claim 1, wherein the ranking of the set of rules further comprises:
   ranking the set of rules based on the first property; and
   ranking at least some rules in the set of rules based on the second property when the at least some rules are tied with respect to the first property.

9. The computer-implemented method of claim 1, wherein the set of properties includes at least one of a respective precision by amount value associated with each rule in the set of rules, a respective true positive amount value associated with each rule in the set of rules, a respective precision by event value associated with each rule in the set of rules, a respective true positive event value associated with each rule in the set of rules, or a respective identifier associated with each rule in the set of rules.

10. The computer-implemented method of claim 1, further comprising:
   defining threshold criteria for retaining rules;
   determining that at least one rule in the record satisfies the threshold criteria for retaining rules; and
   implementing the at least one rule to identify potentially illegitimate activities.

11. The computer-implemented method of claim 10, wherein the threshold criteria for retaining rules is satisfied when the at least one rule is associated with a benefit that outweighs a cost associated with the at least one rule.

12. The computer-implemented method of claim 10, further comprising:
   deprecating one or more rules in the record that fail to satisfy the threshold criteria for retaining rules.

13. The computer-implemented method of claim 1, wherein the record includes at least one of a list, a sequence, an order, or a group.

14. The computer-implemented method of claim 1, wherein the set of activities is identified by the set of rules as being potentially illegitimate based on historical data.

15. The computer-implemented method of claim 14, wherein one or more activities in the set of activities correspond to one or more fraudulent transactions occurring in a networked environment.

16. The computer-implemented method of claim 14, wherein the set of activities is identified by the set of rules as being potentially illegitimate based on applying one or more machine learning techniques to the historical data.

17. The computer-implemented method of claim 16, wherein the one or more machine learning techniques are associated with at least one of an information gain technique, a classification technique, a clustering technique, a decision tree classifier technique, a decision tree learning technique, a random forest technique, a logistic regression technique, a linear regression technique, or a gradient boosting technique.

18. A system comprising:
   at least one processor; and
   a memory storing instructions that, when executed by the at least one processor, cause the system to perform:
      acquiring information associated with a set of rules and a set of activities identified by the set of rules as being potentially illegitimate;
      acquiring a priority order for a set of properties associated with the set of rules, wherein the set of properties includes at least a first property and a second property, and wherein the priority order prioritizes the first property over the second property;
      ranking the set of rules based on the priority order;
      storing a highest ranked rule into a record;
      removing from consideration the highest ranked rule out of the set of rules;
      removing from consideration at least one activity, identified by the highest ranked rule, out of the set of activities; and
      providing the record.

19. A non-transitory computer-readable storage medium including instructions that, when executed by at least one processor of a computing system, cause the computing system to perform:
   acquiring information associated with a set of rules and a set of activities identified by the set of rules as being potentially illegitimate;
   acquiring a priority order for a set of properties associated with the set of rules, wherein the set of properties includes at least a first property and a second property, and wherein the priority order prioritizes the first property over the second property;
   ranking the set of rules based on the priority order;
   storing a highest ranked rule into a record;
   removing from consideration the highest ranked rule out of the set of rules;
   removing from consideration at least one activity, identified by the highest ranked rule, out of the set of activities; and
   providing the record.

* * * * *